(12) United States Patent
Guan et al.

(10) Patent No.: US 9,392,595 B2
(45) Date of Patent: Jul. 12, 2016

(54) CONTROL INFORMATION TRANSMISSION METHOD, USER EQUIPMENT, AND BASE STATION

(71) Applicant: Huawei Technologies Co., Ltd., Shenzhen, Guangdong (CN)

(72) Inventors: Lei Guan, Beijing (CN); Yongxia Lv, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 14/222,250

(22) Filed: Mar. 21, 2014

(65) Prior Publication Data

US 2014/0211710 A1 Jul. 31, 2014

Related U.S. Application Data

(63) Continuation of application No. PCT/CN2012/080362, filed on Aug. 20, 2012.

(30) Foreign Application Priority Data

Sep. 23, 2011 (CN) .......................... 2011 1 0285260

(51) Int. Cl.
*H04W 72/04* (2009.01)
*H04W 28/06* (2009.01)
(Continued)

(52) U.S. Cl.
CPC ............. *H04W 72/042* (2013.01); *H04B 7/063* (2013.01); *H04B 7/0689* (2013.01); *H04B 7/0871* (2013.01); *H04W 28/06* (2013.01); *H04L 1/0035* (2013.01)

(58) Field of Classification Search
CPC .................................................. H04W 72/042
See application file for complete search history.

(56) References Cited

U.S. PATENT DOCUMENTS

2002/0171583 A1 11/2002 Purdy et al.
2011/0019776 A1* 1/2011 Zhang .................. H04L 5/0023
375/340
(Continued)

FOREIGN PATENT DOCUMENTS

CN 101730139 A 6/2010
CN 101841771 A 9/2010
(Continued)

OTHER PUBLICATIONS

"Control signalling design for UL MIMO," 3GPP TSG RAN WG1 Meeting #62, Madrid, Spain, R1-104507, 3$^{rd}$ Generation Partnership Project, Valbonne, France (Aug. 23-27, 2010).

*Primary Examiner* — Jason Mattis
(74) *Attorney, Agent, or Firm* — Leydig, Voit & Mayer, Ltd.

(57) ABSTRACT

The present invention discloses a control information transmission method, a user equipment, and a base station. The method includes: obtaining a data channel transmission mode configured by a base station; determining a downlink control information DCI format set corresponding to the transmission mode, where the DCI format set includes a first DCI format, and the first DCI format includes single-codeword control information; and detecting, according to the DCI format set, control signaling sent by the base station and corresponding to the DCI format set. The user equipment includes a first obtaining module, a first determining module, and a detecting module. The base station includes a configuring module, a first determining module, and a first sending module.

10 Claims, 11 Drawing Sheets

(51) Int. Cl.
*H04B 7/06* (2006.01)
*H04B 7/08* (2006.01)
*H04L 1/00* (2006.01)

(56) References Cited

U.S. PATENT DOCUMENTS

2011/0235586 A1* 9/2011 Han ................ H04B 7/0426
370/328

2013/0028203 A1* 1/2013 Hooli ................ H04L 1/0026
370/329

FOREIGN PATENT DOCUMENTS

| CN | 101969697 A | 2/2011 |
| CN | 102158302 A | 8/2011 |
| WO | WO 2010124721 A1 | 11/2010 |

* cited by examiner

CONTROL INFORMATION TRANSMISSION METHOD, USER EQUIPMENT, AND BASE STATION

CROSS-REFERENCE TO RELATED APPLICATION

This application is a continuation of International Patent Application No. PCT/CN2012/080362, filed on Aug. 20, 2012, which claims priority to Chinese Patent Application No. 201110285260.4, filed on Sep. 23, 2011, both of which are hereby incorporated by reference in their entireties.

TECHNICAL FIELD

The present invention relates to the communications field, and in particular, to a control information transmission method, a user equipment, and a base station in the communications field.

BACKGROUND

In a Long Term Evolution (Long Term Evolution, "LTE" for short) system, an evolved base station (evolved NodeB, "eNB" for short) performs uplink and downlink data scheduling for a user equipment (User Equipment, "UE" for short) by using a physical downlink control channel (Physical Downlink Control Channel, "PDCCH" for short). A minimum time interval of the scheduling is a subframe, and a time length of the subframe is 1 millisecond. In a search space (Search Space) specific to the UE, the UE demodulates and decodes the PDCCH according to a payload size (Payload Size) of the PDCCH and a control channel element (Control Channel Element, "CCE" for short) level, and then uses a UE-specific scrambling code to descramble a cyclic redundancy check (Cyclic Redundancy Check, "CRC" for short) code to check and determine its own PDCCH, and further, performs corresponding processing for a data channel.

Depending on a transmission manner of the scheduled data channel, the PDCCH has a different downlink control information (Downlink Control Information, "DCI" for short) format. For example, a DCI format 1A denotes that a downlink data channel uses a transmit diversity transmission manner or a single-antenna-port transmission manner, and a DCI format 2C denotes a closed loop multi-input multi-output (Multiple Input Multiple Output, "MIMO" for short) transmission manner. The eNB may configure different transmission modes for the data channel of the UE. Under each transmission mode, the eNB can use only a PDCCH of a DCI format corresponding to this transmission mode to perform data scheduling for the UE. For example, two DCI formats corresponding to a transmission mode 9 are a DCI format 2C and a DCI format 1A respectively.

When closed loop MIMO transmission is used, if the UE is at a cell edge or the UE is in a high-speed moving state, a low coding rate is required for sending PDCCH signaling to the UE. Because the payload (Payload) of the DCI format 2C used to schedule the closed loop MIMO transmission is large, the low coding rate leads to increase of the PDCCH overhead and increase of the PDCCH congestion probability, and reduces the utilization rate of control channel resources of a system.

Therefore, a corresponding technical solution is required to overcome the congestion problem of the control channel, and improve the utilization rate of control channel resources of the system.

SUMMARY

Embodiments of the present invention provide a control information transmission method, a user equipment, and a base station, which can overcome the congestion problem of a control channel and improve the utilization rate of control channel resources of a system.

According to one aspect, an embodiment of the present invention provides a control information transmission method, where the method includes: obtaining a data channel transmission mode configured by a base station; determining a downlink control information DCI format set corresponding to the transmission mode, where the DCI format set includes a first DCI format, and the first DCI format includes single-codeword control information; and detecting, according to the DCI format set, control signaling sent by the base station and corresponding to the DCI format set.

According to another aspect, an embodiment of the present invention provides a control information transmission method, where the method includes: configuring a data channel transmission mode; determining a downlink control information DCI format set corresponding to the transmission mode, where the DCI format set includes a first DCI format, and the first DCI format includes single-codeword control information; and sending, according to the DCI format set, control signaling corresponding to the DCI format set to a user equipment.

According to still another aspect, an embodiment of the present invention provides a user equipment, where the user equipment includes: a first obtaining module, adapted to obtain a data channel transmission mode configured by a base station; a first determining module, adapted to determine a downlink control information DCI format set corresponding to the transmission mode obtained by the first obtaining module, where the DCI format set includes a first DCI format, and the first DCI format includes single-codeword control information; and a detecting module, adapted to detect, according to the DCI format set determined by the first determining module, control signaling sent by the base station and corresponding to the DCI format set.

According to still another aspect, an embodiment of the present invention provides a base station, where the base station includes: a configuring module, adapted to configure a data channel transmission mode; a first determining module, adapted to determine a downlink control information DCI format set corresponding to the transmission mode configured by the configuring module, where the DCI format set includes a first DCI format, and the first DCI format includes single-codeword control information; and a first sending module, adapted to send, according to the DCI format set determined by the first determining module, control signaling corresponding to the DCI format set to the user equipment.

Based on the foregoing technical solutions, because the data channel transmission mode corresponds to at least two transmission manners, the control information transmission method, the user equipment, and the base station in the embodiments of the present invention can enhance a control channel, reduce overhead of the control channel, improve system scheduling efficiency and flexibility, overcome the congestion problem of the control channel, and improve the utilization rate of control channel resources of a system.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Understandably, the technical solutions of the present invention are applicable to various communications systems, for example, a Global System of Mobile communication (Global System of Mobile communication, "GSM" for short), a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short) system, a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short) system, a Universal Mobile Telecommunications System (Universal Mobile Telecommunication System, "UMTS" for short), and so on.

Also understandably, a user equipment (User Equipment, "UE" for short) in the embodiments of the present invention is also known as a terminal (Terminal), a mobile station (Mobile Station, "MS" for short), a mobile terminal (Mobile Terminal), and so on; and the user equipment may communicate with one or more core networks through a radio access network (Radio Access Network, "RAN" for short). For example, the user equipment may be a mobile phone (or called a "cellular" phone), or a computer with a mobile terminal, and the user equipment may also be a mobile apparatus that is portable, pocket-sized, handheld, computer built-in, or vehicle-mounted, which exchanges voice and/or data with the radio access network.

In the embodiments of the present invention, a base station may be a base station (Base Transceiver Station, "BTS" for short) in the GSM or CDMA, or a base station (NodeB, "NB" for short) in the WCDMA, or an evolved base station (Evolved NodeB, "eNB or e-NodeB" for short) in the LTE, which is not limited in the present invention. However, for ease of description, the following embodiments are described by using a base station eNB and a user equipment UE as an example.

Figure 1:
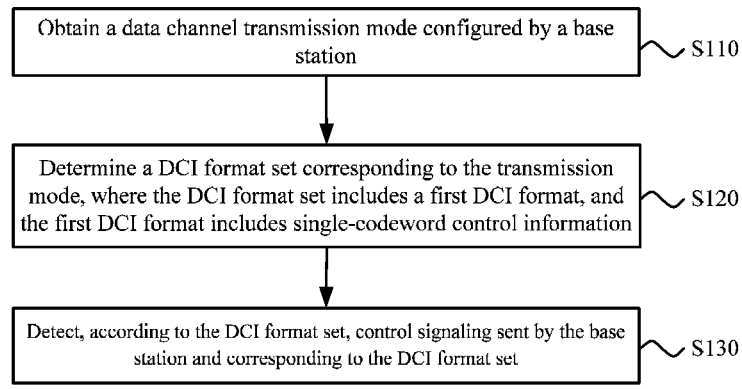
FIG. 1 is a schematic flowchart of a control information transmission method according to an embodiment of the present invention.

FIG. 1 shows a schematic flowchart of a control information transmission method according to an embodiment of the present invention. As shown in FIG. 1, the method includes:

S110. Obtain a data channel transmission mode configured by a base station.

S120. Determine a downlink control information DCI format set corresponding to the transmission mode, where the DCI format set includes a first DCI format, and the first DCI format includes single-codeword control information.

S130. Detect, according to the DCI format set, control signaling sent by the base station and corresponding to the DCI format set.

First, a user equipment may obtain the data channel transmission mode configured by the base station, and determine, according to the transmission mode, a DCI format set corresponding to a control channel for scheduling the data channel. In this way, the user equipment can detect, according to the DCI format set, the control signaling sent by the base station and corresponding to the DCI format set, and further perform receiving and sending for the data channel according to the detected control signaling.

Therefore, because the data channel transmission mode corresponds to at least two transmission manners, the control information transmission method in the embodiment of the present invention can enhance a control channel, reduce overhead of the control channel, improve system scheduling efficiency and flexibility, overcome the congestion problem of the control channel, and improve the utilization rate of control channel resources of a system.

Specifically, in S110, the user equipment may use multiple manners to obtain the data channel transmission mode configured by the base station. Optionally, the user equipment may obtain, by receiving higher layer signaling sent by the base station, the data channel transmission manner configured by the base station. Specifically, for example, the user equipment may receive radio resource control (Radio Resource Control, "RRC" for short) signaling sent by the base station, where the RRC signaling includes the data channel transmission mode configured by the base station.

In S120, the user equipment determines the downlink control information DCI format set corresponding to the transmission mode, where the DCI format set includes the first DCI format, and the first DCI format includes the single-codeword control information, for example, control information such as a modulation coding scheme (Modulation Codec Scheme) corresponding to a single codeword, a redundant version, and a new packet indication.

In S130, the user equipment detects, according to the DCI format set, the control signaling sent by the base station and corresponding to the DCI format set.

Understandably, in the embodiment of the present invention, data channels may include a physical downlink shared channel (Physical Downlink Shared Channel, "PDSCH" for short) and a physical uplink shared channel (Physical Uplink Shared Channel, "PUSCH" for short); and control channels may include a PDCCH and a physical uplink control channel (Physical Uplink Control Channel, "PUCCH" for short). The embodiment of the present invention is described by using the PDCCH, the PDSCH, and the PUSCH as examples, but the embodiment of the present invention is not limited thereto.

In the embodiment of the present invention, optionally, the first DCI format includes identifier information, where the identifier information indicates a first state or a second state, the first state means that a data channel scheduled in the first DCI format uses a closed loop multi-input multi-output MIMO transmission manner, and the second state means that the data channel scheduled in the first DCI format uses a transmit diversity transmission manner or an open loop single-antenna-port transmission manner.

Figure 2:
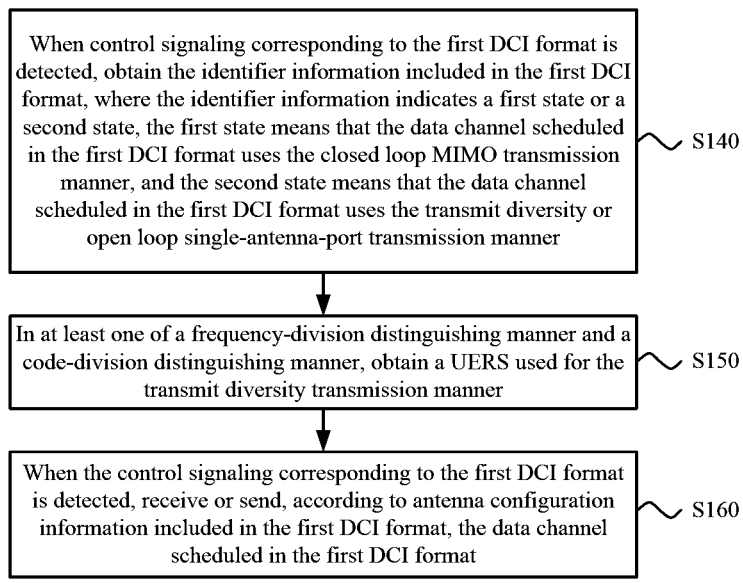
FIG. 2 is another schematic flowchart of a control information transmission method according to an embodiment of the present invention.

Therefore, as shown in FIG. 2, the control information transmission method according to an embodiment of the present invention may further include:

S140. When the user equipment detects control signaling corresponding to the first DCI format, the user equipment obtains the identifier information included in the first DCI format, where the identifier information indicates the first state or the second state, the first state means that the data channel scheduled in the first DCI format uses the closed loop multi-input multi-output MIMO transmission manner, and the second state means that the data channel scheduled in the first DCI format uses the transmit diversity transmission manner or the open loop single-antenna-port transmission manner. Optionally, the closed loop MIMO transmission manner used by the data channel may be based on a UE-specific reference signal (UE-specific Reference Signal, "UERS" for short), or based on a cell-specific reference signal (Cell-specific Reference Signal, "CRS" for short).

Therefore, because one DCI format indicates two transmission manners, the method according to the embodiment of the present invention can enhance a control channel, reduce overhead of control signaling, improve system scheduling efficiency and flexibility, overcome the congestion problem of the control channel, and improve the utilization rate of control channel resources of a system.

Specifically, the first DCI format may include identifier information, where the identifier information may specifically be a bit, scrambling code, or other time-frequency resource information. The following uses 1-bit identifier information as an example for description.

When the bit indicates the first state, for example, when the bit value is "0", it indicates that a data channel scheduled by PDCCH signaling corresponding to the first DCI format uses the closed loop MIMO transmission manner. This transmission manner may be used in an application scenario with good UE channel conditions or a low-speed application scenario, so as to obtain a closed loop MIMO precoding gain. When the bit indicates the second state, for example, when the bit value is "1", it indicates that the data channel scheduled by the PDCCH signaling corresponding to the first DCI format uses the transmit diversity transmission manner or an open loop single-antenna-port transmission manner. The transmit diversity transmission manner may be based on a UERS or CRS, and the transmit diversity transmission manner or the open loop single-antenna-port transmission manner may be used in an application scenario with poor UE channel conditions or a high-speed movement application scenario, which can prevent precoding gain decrease caused by inaccuracy of channel state estimation, so that performance robustness of the control channel can be improved, and overhead of the control channel can be reduced. In addition, both of the above two transmission manners are implemented by one DCI format, which can simplify blind detection performed by the user equipment for the control channel.

In the embodiment of the present invention, when the identifier information included in the first DCI format indicates the second state and the second state means that the data channel scheduled in the first DCI format uses the transmit diversity transmission manner, the user equipment may obtain antenna port information of the transmit diversity by performing preconfiguring or using higher layer signaling or physical layer signaling, where the higher layer signaling includes RRC signaling and media access control (Media Access Control, "MAC" for short) signaling, and the physical layer signaling includes PDCCH signaling. For example, the physical layer signaling may specifically be the PDCCH signaling corresponding to the first DCI format.

In the embodiment of the present invention, if the user equipment uses a UERS-based transmit diversity transmission manner, UERSs of multiple antenna ports may be distinguished in at least one of a frequency-division distinguishing manner and a code-division distinguishing manner, thereby simplifying the complexity of the transmit diversity space coding because a UERS in the frequency-division manner can ensure that the number of subcarriers on one symbol in a resource block is an even number.

Therefore, in the embodiment of the present invention, optionally, as shown in FIG. 2, the control information transmission method according to the embodiment of the present invention may further include:

S150. In at least one of the frequency-division distinguishing manner and the code-division distinguishing manner, the user equipment obtains a user equipment-specific reference signal UERS used for the transmit diversity transmission manner. In this way, according to the UERS, the user equipment can demodulate the data channel sent based on the transmit diversity manner.

In the embodiment of the present invention, the identifier information may further indicate the first state, where the first state means that the data channel scheduled in the first DCI format uses the closed loop MIMO transmission manner. In this case, the first DCI format may further include antenna configuration information, where the antenna configuration information may include one or more of codeword information, antenna port information, reference signal scrambling code identifier information, precoding matrix identifier information, and information about the number of space layers. The user equipment may receive or send a corresponding data channel according to the antenna configuration information.

Therefore, in the embodiment of the present invention, optionally, as shown in FIG. 2, the control information transmission method according to the embodiment of the present invention may further include:

S160. When the control signaling corresponding to the first DCI format is detected, the user equipment receives or sends, according to antenna configuration information included in the first DCI format, the data channel scheduled in the first DCI format, where the data channel scheduled in the first DCI format uses the closed loop MIMO transmission manner, and the antenna configuration information includes at least one of codeword information, antenna port information, reference signal scrambling code identifier information, precoding matrix identifier information, and information about the number of space layers.

Optionally, the codeword information includes a codeword identifier, and the codeword identifier denotes a codeword number of data transmitted over the data channel scheduled in the first DCI format. In this way, it can be avoided that the UE understands the codeword inconsistently in the case where the base station detects hybrid automatic repeat request (Hybrid Automatic Repeat Quest, "HARQ" for short) acknowledge (Acknowledge, "ACK" for short)/non-acknowledge (Non-Acknowledge, "NACK" for short) information mistakenly, so that the system reliability can be improved.

In the embodiment of the present invention, optionally, the DCI format set further includes a second DCI format, the second DCI format includes dual-codeword control information, and a data channel scheduled based on the second DCI format uses a closed loop MIMO transmission manner that is precoded based on channel information and inclusive of one or more layers.

Specifically, the DCI format set may include the first DCI format, the first DCI format may include the identifier information, and the identifier information indicates the first state or the second state; and the DCI format set may further include the second DCI format, the second DCI format includes the dual-codeword control information, and the data channel scheduled in the second DCI format uses the closed loop MIMO transmission manner inclusive of one or more layers, such as a DCI format 2C. When the UE channel conditions are good, the base station performs downlink data scheduling for the UE by sending PDCCH signaling corresponding to the second DCI format; when the UE channel conditions are not very good, for example, when the UE is at a cell edge, multi-layer transmission consumes large power overhead, but the channel state can be captured accurately if the UE moves at a low speed. Therefore, the base station may perform scheduling by using a first DCI format of a single-layer closed loop MIMO transmission manner. If the UE is moving at a high speed, the base station may perform scheduling by using a first DCI format of a UERS-based transmit diversity transmission manner, or an open loop single-antenna-port transmission manner, or a truncated CRS-based transmit diversity transmission mode, where the truncated CRS means that the CRS exists on only a part of bandwidths.

In the embodiment of the present invention, optionally, the DCI format set further includes a second DCI format, the second DCI format includes dual-codeword control information, and a data channel scheduled based on the first DCI format and the second DCI format uses a closed loop MIMO transmission manner that is precoded based on channel information and inclusive of one or more layers.

That is to say, the data channel transmission mode configured by the base station corresponds to a downlink DCI format set. The DCI format set includes the first DCI format and the second DCI format. The first DCI format includes the single-codeword control information, and the data channel scheduled in the first DCI format uses the closed loop MIMO transmission manner that is precoded based on the channel information and inclusive of one or more layers; and the second DCI format includes the dual-codeword control information, and the data channel scheduled in the second DCI format also uses the closed loop MIMO transmission manner that is precoded based on the channel information and inclusive of one or more layers.

For example, when the second DCI format such as the DCI format 2C is used to perform initial-transmission dual-codeword scheduling, if one codeword needs retransmission, the other codeword is transmitted correctly and needs no retransmission and the initial transmission of this codeword uses multi-layer transmission such as transmission of two or more layers, then the retransmission scheduling of the codeword that needs retransmission may use the first DCI format of the single-layer closed loop MIMO transmission manner. The first DCI format includes single-codeword and multi-layer antenna configuration information, and the payload of the first DCI format is much smaller than the payload of the second DCI format, and therefore, the overhead of the control channel can be saved.

Understandably, in the foregoing embodiment, the first DCI format may also include the identifier information, where the identifier information indicates the first state or the second state, the first state means that the data channel scheduled in the first DCI format uses the closed loop multi-input multi-output MIMO transmission manner, and the second state means that the data channel scheduled in the first DCI format uses the transmit diversity transmission manner or the open loop single-antenna-port transmission manner.

Therefore, in the control information transmission method in the embodiment of the present invention, the identifier information included in the first DCI format can be used to indicate two transmission manners, or the DCI format set corresponding to the transmission mode includes the first DCI format and the second DCI format, where both the first DCI format and the second DCI format schedule the data channel that uses the closed loop MIMO transmission manner. Therefore, the data channel transmission mode corresponds to at least two transmission manners, which can enhance a control channel, reduce overhead of the control channel, improve system scheduling efficiency and flexibility, overcome the congestion problem of the control channel, and improve the utilization rate of control channel resources of a system.

In the embodiment of the present invention, when the data channel scheduled in the first DCI format uses the closed loop MIMO transmission manner, that is, the identifier information included in the first DCI format indicates the first state, the first DCI format may further include the antenna configuration information, so as to receive or send the data channel scheduled in the first DCI format. The information about the number of space layers in the antenna configuration information may be one layer or more layers, where the more layers refer to at least two layers. Understandably, the scenario of multiple layers corresponds only to the scheduling of a retransmitted codeword. The following gives a detailed description about the scheduling of a downlink data channel and the scheduling of an uplink data channel respectively with reference to FIG. 3.

Figure 3:
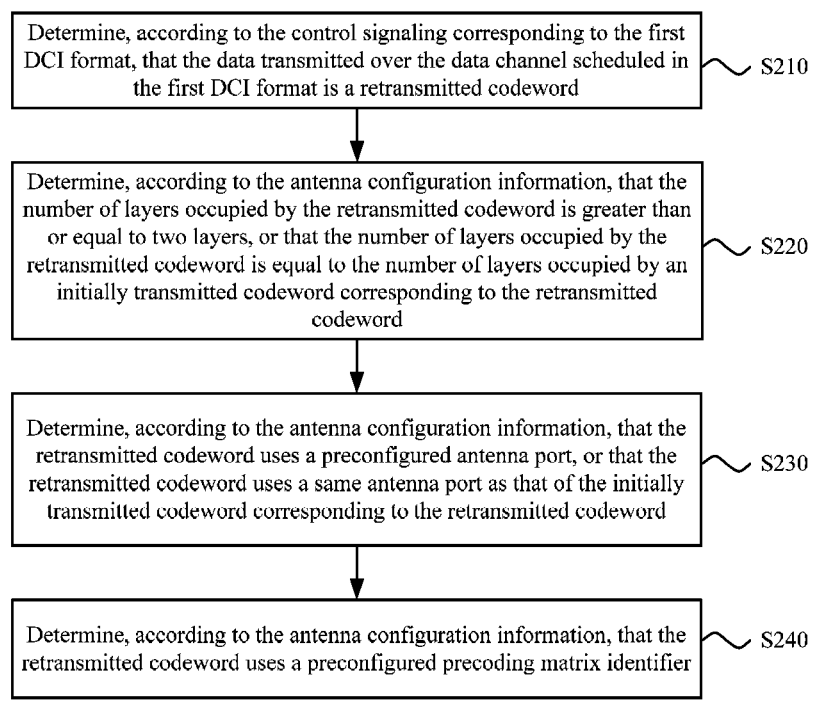
FIG. 3 is still another schematic flowchart of a control information transmission method according to an embodiment of the present invention.

As shown in FIG. 3, the method according to the embodiment of the present invention may further include:

S210. The user equipment determines, according to the control signaling corresponding to the first DCI format, that data transmitted over the data channel scheduled in the first DCI format is a retransmitted codeword;

S220. the user equipment determines, according to the antenna configuration information, that the number of layers occupied by the retransmitted codeword is greater than or equal to two layers, or that the number of layers occupied by the retransmitted codeword is equal to the number of layers occupied by an initially transmitted codeword corresponding to the retransmitted codeword; and/or S230. the user equipment determines, according to the antenna configuration information, that the retransmitted codeword uses a preconfigured antenna port, or that the retransmitted codeword uses a same antenna port as that of the initially transmitted codeword corresponding to the retransmitted codeword; and/or S240. the user equipment determines, according to the antenna configuration information, that the retransmitted codeword uses a preconfigured precoding matrix identifier.

Understandably, in the embodiments of the present invention, the sequence number of each process does not represent order of implementation, and the order of implementing the processes depends on their functions and inherent logics, and shall not constitute any limitation to the implementation process of the embodiments of the present invention.

Specifically, for the scheduling of the downlink data channel, if an identifier state of the antenna configuration information in the first DCI format indicates that a codeword of a current retransmitted packet is transmitted in a multi-layer manner, the number of layers of the retransmitted codeword that is transmitted in the multi-layer manner is the same as the number of layers occupied by an initially transmitted codeword corresponding to the retransmitted codeword, and an antenna port and an identifier of a reference signal scrambling code of the retransmitted codeword use preconfigured values or same values as those of the initially retransmitted codeword. Optionally, the first DCI format may further include a codeword identifier, where the codeword identifier indicates which of two codewords of an initially transmitted packet corresponds to the retransmitted codeword. In this way, it can be avoided that the UE understands the codeword inconsistently in the case where the base station detects HARQ ACK/NACK information mistakenly, so that the system reliability can be improved.

Specifically, assuming that a DCI format set corresponding to a transmission mode of a PDSCH includes a first DCI format and a second DCI format, and the first DCI format and the second DCI format are a DCI format 1E and the DCI format 2C respectively. The following Table 1 shows antenna configuration information in the DCI format 2C, including single-codeword configuration information and dual-codeword configuration information. Single-codeword identifier states 4, 5, and 6 denote transmission of a retransmitted codeword corresponding to multi-layer transmission of a single codeword. Table 2 shows antenna configuration information in the DCI format 1E, including not only four indication states of a single layer of a single codeword, but also two states that are identifier states denoting multi-layer retransmission of a single codeword. Further, the antenna configuration information specifically includes an indication of the codeword identifier, and the number of layers of the retransmitted codeword is equal to the number of layers of the initially transmitted codeword corresponding to the codeword. A specific antenna port may be preconfigured. For example, when the number of layers is 2, ports are {7, 8}; and, when the number of layers is 4, ports are {7, 8, 9, 10}, and so on. The antenna ports may also be the same as antenna ports of the initially transmitted codeword corresponding to the retransmitted codeword. Optionally, the first DCI format such as the DCI format 1E can also be used to notify the specific number of layers of multi-layer transmission of a single codeword. For example, such information is indicated by independent state values respectively.

TABLE 1

| Single codeword | | Dual codeword | |
| --- | --- | --- | --- |
| State value | Antenna configuration information | State value | Antenna configuration information |
| 0 | Single layer, port 7, scrambling code 0 | 0 | Two layers, ports 7-8, scrambling code 0 |
| 1 | Single layer, port 7, scrambling code 1 | 1 | Two layers, ports 7-8, scrambling code 1 |
| 2 | Single layer, port 8, scrambling code 0 | 2 | Three layers, ports 7-9, scrambling code 0 |
| 3 | Single layer, port 8, scrambling code 1 | 3 | Four layers, ports 7-10, scrambling code 0 |
| 4 | Two layers, ports 7-8, scrambling code 0 | 4 | Five layers, ports 7-11, scrambling code 0 |
| 5 | Three layers, ports 7-9, scrambling code 0 | 5 | Six layers, ports 7-12, scrambling code 0 |
| 6 | Four layers, ports 7-10, scrambling code 0 | 6 | Seven layers, ports 7-13, scrambling code 0 |
| 7 | Reserved state | 7 | Eight layers, ports 7-14, scrambling code 0 |

TABLE 2

| Single codeword | |
| --- | --- |
| State value | Antenna configuration information |
| 0 | Single layer, port 7, scrambling code 0 |
| 1 | Single layer, port 7, scrambling code 1 |
| 2 | Single layer, port 8, scrambling code 0 |
| 3 | Single layer, port 8, scrambling code 1 |
| 4 | Codeword 0 retransmission (the number of layers is equal to the number of layers existent when the codeword is initially transmitted) |
| 5 | Codeword 1 retransmission (the number of layers is equal to the number of layers existent when the codeword is initially transmitted) |
| 6 | Reserved state |
| 7 | Reserved state |

For example, it is assumed that the base station uses the DCI format 2C to schedule an initially transmitted packet, which includes two codewords (assuming codeword 0 and codeword 1) transmitted on a total of four layers, of the UE. Each codeword corresponds to two layers. That is to say, the codeword 0 corresponds to two layers of ports {7, 8}, and the codeword 1 corresponds to two other layers of ports {9, 10}. In this case, the antenna configuration information in the DCI format 2C should indicate a dual codeword state 3. The UE receives the DCI format 2C and receives a corresponding PDSCH according to the antenna configuration information and other scheduling information in the DCI format 2C. If the codeword 0 is received correctly but the codeword 1 is received incorrectly, the UE feeds back an ACK for the codeword 0 but feeds back a NACK for the codeword 1. After receiving the ACK and the NACK correctly, the base station performs retransmission scheduling for the codeword 1. In this case, the DCI format 1E whose payload is smaller than that of the DCI format 2C may be used to perform retransmission scheduling, and the antenna configuration information in the DCI format 1E indicates a state 5, that is, retransmission of the codeword 1. The UE receives the DCI format 1E, and may determine, according to the antenna configuration information, that the transmission is a retransmission of the codeword 1, and that the number of layers is equal to the number of layers of the codeword 1 that is initially transmitted, that is, two layers. In addition, the antenna port may be preconfigured antenna ports {7, 8}, or the antenna ports {9, 10} that are the same as those used for initial retransmission. Then the UE receives the retransmitted packet.

Specifically, for scheduling of an uplink data channel, the UE must know a transmitting precoding matrix of uplink scheduling, but the number of antenna ports is preconfigured. For example, the number of antenna ports is notified by using RRC signaling. Sequence numbers of the antenna ports are preconfigured. For example, the sequence numbers of the antenna ports are {20, 21} if there are two antennas, and are {40, 41, 42, 43} if there are four antennas. Therefore, information that needs to be indicated in the antenna configuration information should include a transmitting precoding matrix identifier and information about the number of layers. If an identifier state of the antenna configuration information in the first DCI format indicates that a codeword of a current retransmitted packet is transmitted in a multi-layer manner, the number of layers of the retransmitted codeword that is transmitted in the multi-layer manner is the same as the number of layers occupied by an initially transmitted codeword corresponding to the retransmitted codeword. Optionally, the first DCI format may further include a codeword identifier, where the codeword identifier indicates which of two codewords of an initially transmitted packet corresponds to the retransmitted codeword. In this way, it can be avoided that the UE understands the codeword inconsistently in the case where the base station detects HARQ ACK/NACK information mistakenly, and the system reliability can be improved.

Specifically, assuming that the DCI format set corresponding to the transmission mode of the PDSCH includes a first DCI format and a second DCI format, and the first DCI format and the second DCI format are a DCI format 4A and a DCI format 4 respectively. The following Table 3 shows antenna configuration information in the DCI format 4, including single-codeword configuration information and dual-codeword configuration information. Single-codeword identifier states 24-39 denote transmission of retransmitted codewords corresponding to multiple layers of a single codeword. Table 4 shows antenna configuration information in the DCI format 4A, including not only indication states 0-23 of a single layer of a single codeword, but also two states 24 and 25 that are identifier states denoting multi-layer retransmission of a single codeword. Further, the antenna configuration information specifically includes an indication of the codeword identifier, and the number of layers of the retransmitted codeword is equal to the number of layers of the initially transmitted codeword corresponding to the codeword. A specific transmitting precoding matrix identifier may be preconfigured, for example, transmitting precoding matrix identifier 0. Optionally, the first DCI format such as the DCI format 4A can also be used to notify the specific number of layers of multi-layer transmission of a single codeword. For example, such information is indicated by independent state values respectively.

TABLE 3

| Single codeword | | Dual codeword | |
| --- | --- | --- | --- |
| State value | Antenna configuration information | State value | Antenna configuration information |
| 0 | Single layer, transmitting precoding matrix identifier 0 | 0 | Two layers, transmitting precoding matrix identifier 0 |
| 1 | Single layer, transmitting precoding matrix identifier 1 | 1 | Two layers, transmitting precoding matrix identifier 1 |
| ... | ... | ... | ... |
| 23 | Single layer, transmitting precoding matrix identifier 23 | 15 | Two layers, transmitting precoding matrix identifier 15 |
| 24 | Two layers, transmitting precoding matrix identifier 0 | 16 | Three layers, transmitting precoding matrix identifier 0 |
| 25 | Two layers, transmitting precoding matrix identifier 1 | 17 | Three layers, transmitting precoding matrix identifier 1 |
| ... | ... | ... | ... |
| 39 | Two layers, transmitting precoding matrix identifier 15 | 27 | Three layers, transmitting precoding matrix identifier 11 |
| 40-63 | Reserved state | 28 | Four layers, transmitting precoding matrix identifier 0 |
| | | 29-63 | Reserved state |

TABLE 4

| Single codeword | |
| --- | --- |
| State value | Antenna configuration information |
| 0 | Single layer, transmitting precoding matrix identifier 0 |
| 1 | Single layer, transmitting precoding matrix identifier 1 |
| ... | ... |
| 23 | Single layer, transmitting precoding matrix identifier 23 |
| 24 | Codeword 0 retransmission (the number of layers is equal to the number of layers existent when the codeword is initially transmitted), preconfigured transmitting precoding matrix identifier (such as identifier 0) |
| 25 | Codeword 1 retransmission (the number of layers is equal to the number of layers existent when the codeword is initially transmitted), preconfigured transmitting precoding matrix identifier (such as identifier 0) |
| 26-31 | Reserved state |

For example, it is assumed that the base station uses the DCI format 4 to schedule an initially transmitted packet, which includes two codewords (assuming codeword 0 and codeword 1) transmitted on a total of four layers, of the UE. Each codeword corresponds to two layers. In this case, the antenna configuration information in the DCI format 4 should indicate a dual codeword state 28. The UE receives the DCI format 4 and receives a corresponding PUSCH according to the antenna configuration information and other scheduling information in the DCI format 4. If the codeword 0 is received correctly but the codeword 1 is received incorrectly, the base station feeds back an ACK for the codeword 0 but feeds back a NACK for the codeword 1. After receiving the ACK and the NACK correctly, the UE continues subsequent transmission for the codeword 1. In this case, the base station may use the DCI format 4A whose payload is smaller than that of the DCI format 4 to perform retransmission scheduling, and the antenna configuration information in the DCI format 4A indicates a state 25, that is, retransmission of the codeword 1. The UE receives the DCI format 4A, and determines, according to the antenna configuration information, that the transmission is a retransmission of the codeword 1, and that the number of layers is equal to the number of layers of the codeword 1 that is initially transmitted, that is, two layers. In addition, a preconfigured precoding matrix identifier 0 may be selected as the precoding matrix identifier, and then the UE sends the retransmitted packet.

In the embodiment of the present invention, optionally, the DCI format set further includes a third DCI format. A data channel scheduled based on the third DCI format uses a transmission manner based on a transmit diversity or a transmission manner based on an open-loop single antenna port. Optionally, the DCI format is located in a common search space, that is, a search space in which at least two UEs need to perform a search. Optionally, the third DCI format may also be located in a UE-specific search space on an anchor carrier, but is not allowed to be located in a UE-specific search space on a supplementary carrier.

Specifically, the UE detects control signaling corresponding to the first DCI format and the second DCI format in the UE-specific search space. Further, the UE needs to detect, in the common search space and the UE-specific search space on the anchor carrier, control signaling corresponding to the third DCI format, and process a corresponding data channel according to the detected control signaling.

The foregoing embodiment can ensure that the number of times of blind detection performed by the UE for the PDCCH does not increase compared with an existing system, and that the implementation complexity of the UE does not increase.

Therefore, because the data channel transmission mode corresponds to at least two transmission manners, the control information transmission method in the embodiment of the present invention can enhance a control channel, reduce overhead of the control channel, improve system scheduling efficiency and flexibility, overcome the congestion problem of the control channel, and improve the utilization rate of control channel resources of a system. In addition, the foregoing solution supports dynamic switching from a single layer to multiple layers, where the single layer includes single-layer initial transmission and retransmission. Because the scheduling is performed by using a DCI format that has a smaller payload, the PDCCH overhead is saved. Moreover, because dynamic rollback to the single-antenna-port mode or the transmit diversity mode is supported, performance robustness is improved.

Figure 4:
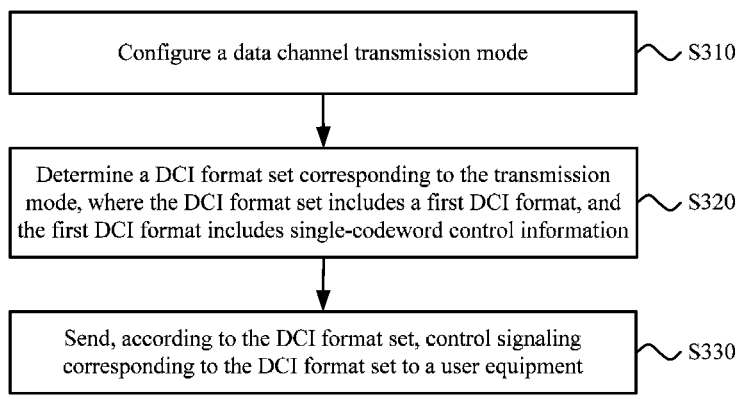
FIG. 4 is a schematic flowchart of a control information transmission method according to another embodiment of the present invention.
Figure 5:
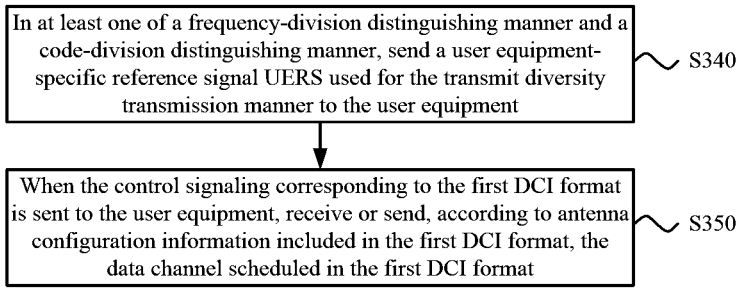
FIG. 5 is another schematic flowchart of a control information transmission method according to another embodiment of the present invention.
Figure 6:
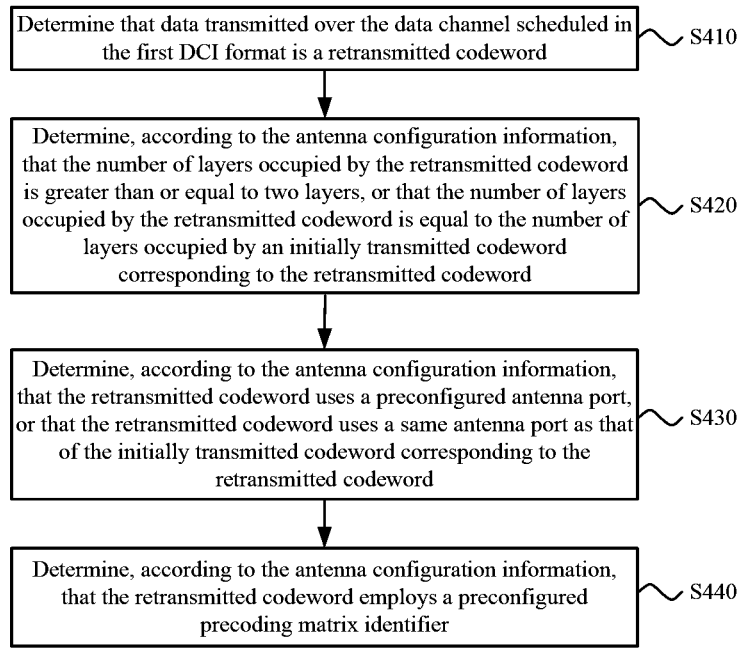
FIG. 6 is still another schematic flowchart of a control information transmission method according to another embodiment of the present invention.

The foregoing has described the control information transmission method according to the embodiments of the present invention in detail from a perspective of the user equipment with reference to FIG. 1 to FIG. 3, and the following describes the control information transmission method according to the embodiments of the present invention in detail from a perspective of the base station with reference to FIG. 4 to FIG. 6.

FIG. 4 shows a schematic flowchart of a control information transmission method according to an embodiment of the present invention. As shown in FIG. 4, the method includes:

S310. Configure a data channel transmission mode.

S320. Determine a downlink control information DCI format set corresponding to the transmission mode, where the DCI format set includes a first DCI format, and the first DCI format includes single-codeword control information.

S330. Send, according to the DCI format set, control signaling corresponding to the DCI format set to the user equipment.

Therefore, because the data channel transmission mode corresponds to at least two transmission manners, the control information transmission method in the embodiment of the present invention can enhance a control channel, reduce overhead of the control channel, improve system scheduling efficiency and flexibility, overcome the congestion problem of the control channel, and improve the utilization rate of control channel resources of a system.

In the embodiment of the present invention, optionally, the first DCI format includes identifier information, where the identifier information indicates a first state or a second state, the first state means that a data channel scheduled in the first DCI format uses a closed loop multi-input multi-output MIMO transmission manner, and the second state means that the data channel scheduled in the first DCI format uses a transmit diversity transmission manner or an open loop single-antenna-port transmission manner.

Therefore, in S330, the sending, by a base station, control signaling corresponding to the DCI format set to a user equipment, may include:

when it is determined that a data channel scheduled in the first DCI format uses a closed loop multi-input multi-output MIMO transmission manner, sending, by the base station, control signaling corresponding to the first DCI format that includes identifier information to the user equipment, where the identifier information indicates a first state; or when it is determined that a data channel scheduled in the first DCI format uses a transmit diversity transmission manner or an open loop single-antenna-port transmission manner, sending, by the base station, control signaling corresponding to the first DCI format that includes identifier information to the user equipment, where the identifier information indicates a second state.

In the embodiment of the present invention, as shown in FIG. 5, optionally, the method may further include:

S340. In at least one of a frequency-division distinguishing manner and a code-division distinguishing manner, the base station sends a user equipment-specific reference signal UERS used for the transmit diversity transmission manner to the user equipment.

In the embodiment of the present invention, as shown in FIG. 5, optionally, the method may further include:

S350. When the control signaling corresponding to the first DCI format is sent to the user equipment, the base station receives or sends, according to antenna configuration information included in the first DCI format, the data channel scheduled in the first DCI format, where the data channel scheduled in the first DCI format uses the closed loop MIMO transmission manner, and the antenna configuration information includes at least one of codeword information, antenna port information, reference signal scrambling code identifier information, precoding matrix identifier information, and information about the number of space layers.

Optionally, the codeword information includes a codeword identifier, and the codeword identifier denotes a codeword number of data transmitted over the data channel scheduled in the first DCI format. In this way, it can be avoided that the UE understands the codeword inconsistently in the case where the base station detects hybrid automatic repeat request HARQ ACK/NACK information mistakenly, so that the system reliability can be improved.

In the embodiment of the present invention, optionally, the DCI format set further includes a second DCI format, the second DCI format includes dual-codeword control information, and a data channel scheduled based on the second DCI format uses a closed loop MIMO transmission manner that is precoded based on channel information and inclusive of one or more layers.

Specifically, the DCI format set may include the first DCI format, the first DCI format may include the identifier information, and the identifier information indicates the first state or the second state; and the DCI format set may further include the second DCI format, the second DCI format includes the dual-codeword control information, and the data channel scheduled in the second DCI format uses the closed loop MIMO transmission manner inclusive of one or more layers.

In the embodiment of the present invention, optionally, the DCI format set further includes a second DCI format, the second DCI format includes dual-codeword control information, and a data channel scheduled based on the first DCI format and the second DCI format uses a closed loop MIMO transmission manner that is precoded based on channel information and inclusive of one or more layers.

Specifically, the data channel transmission mode configured by the base station corresponds to a downlink DCI format set. The DCI format set includes the first DCI format and the second DCI format. The first DCI format includes the single-codeword control information, and the data channel scheduled in the first DCI format uses the closed loop MIMO transmission manner that is precoded based on the channel information and inclusive of one or more layers; and the second DCI format includes the dual-codeword control information, and the data channel scheduled in the second DCI format also uses the closed loop MIMO transmission manner that is precoded based on the channel information and inclusive of one or more layers.

In the embodiment of the present invention, as shown in FIG. 6, optionally, the method may further include:

S410. The base station determines that data transmitted over the data channel scheduled in the first DCI format is a retransmitted codeword;

S420. the base station determines, according to the antenna configuration information, that the number of layers occupied by the retransmitted codeword is greater than or equal to two layers, or that the number of layers occupied by the retransmitted codeword is equal to the number of layers occupied by an initially transmitted codeword corresponding to the retransmitted codeword; and/or S430. the base station determines, according to the antenna configuration information, that the retransmitted codeword uses a preconfigured antenna port, or that the retransmitted codeword uses a same antenna port as that of the initially transmitted codeword corresponding to the retransmitted codeword; and/or S440. the base station determines, according to the antenna configuration information, that the retransmitted codeword uses a preconfigured precoding matrix identifier.

Understandably, the number of layers occupied by the retransmitted codeword may also be unequal to the number of layers occupied by the initially transmitted codeword corresponding to the retransmitted codeword, and an antenna port used by the retransmitted codeword may also be different from an antenna port used by the initially transmitted codeword corresponding to the retransmitted codeword. Optionally, the first DCI format such as the DCI format 4A can also be used to notify the specific number of layers of multi-layer transmission of a single codeword. For example, such information is indicated by independent state values respectively.

In the embodiment of the present invention, optionally, the DCI format set further includes a third DCI format. A data channel scheduled based on the third DCI format uses a transmission manner based on a transmit diversity or a transmission manner based on an open-loop single antenna port. Optionally, the DCI format is located in a common search space, that is, a search space in which at least two UEs need to perform a search. Optionally, the third DCI format may also be located in a UE-specific search space on an anchor carrier, but is not allowed to be located in a UE-specific search space on a supplementary carrier.

Understandably, in the embodiments of the present invention, the sequence number of each process does not represent order of implementation, and the order of implementing the processes depends on their functions and inherent logics, and shall not constitute any limitation on the implementation process of the embodiments of the present invention.

Therefore, because the data channel transmission mode corresponds to at least two transmission manners, the control information transmission method in the embodiment of the present invention can enhance a control channel, reduce overhead of the control channel, improve system scheduling efficiency and flexibility, overcome the congestion problem of the control channel, and improve the utilization rate of control channel resources of a system. In addition, the foregoing solution supports dynamic switching from a single layer to multiple layers, where the single layer includes single-layer initial transmission and retransmission. Because the scheduling is performed by using a DCI format that has a smaller payload, the PDCCH overhead is saved. Moreover, because dynamic rollback to the single-antenna-port mode or the transmit diversity mode is supported, performance robustness is improved.

The foregoing has described the control information transmission method according to the embodiments of the present invention in detail with reference to FIG. 1 to FIG. 6, and the following describes the user equipment and the base station according to the embodiments of the present invention in detail with reference to FIG. 7 to FIG. 13.

Figure 7:
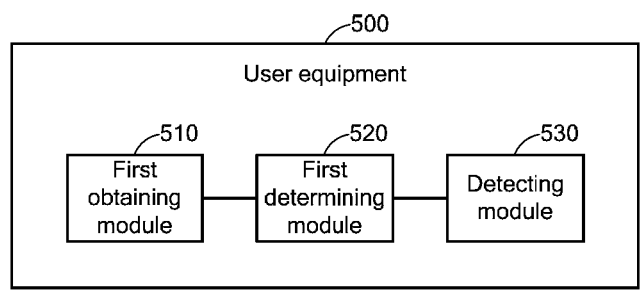
FIG. 7 is a schematic block diagram of a user equipment according to an embodiment of the present invention.

FIG. 7 shows a schematic block diagram of a user equipment 500 according to an embodiment of the present invention. As shown in FIG. 7, the user equipment 500 includes:

a first obtaining module 510, adapted to obtain a data channel transmission mode configured by a base station;

a first determining module 520, adapted to determine a downlink control information DCI format set corresponding to the transmission mode obtained by the first obtaining module 510, where the DCI format set includes a first DCI format, and the first DCI format includes single-codeword control information; and a detecting module 530, adapted to detect, according to the DCI format set determined by the first determining module 520, control signaling sent by the base station and corresponding to the DCI format set.

Therefore, because the data channel transmission mode corresponds to at least two transmission manners, the user equipment in the embodiment of the present invention can enhance a control channel, reduce overhead of the control channel, improve system scheduling efficiency and flexibility, overcome the congestion problem of the control channel, and improve the utilization rate of control channel resources of a system.

Figure 8:
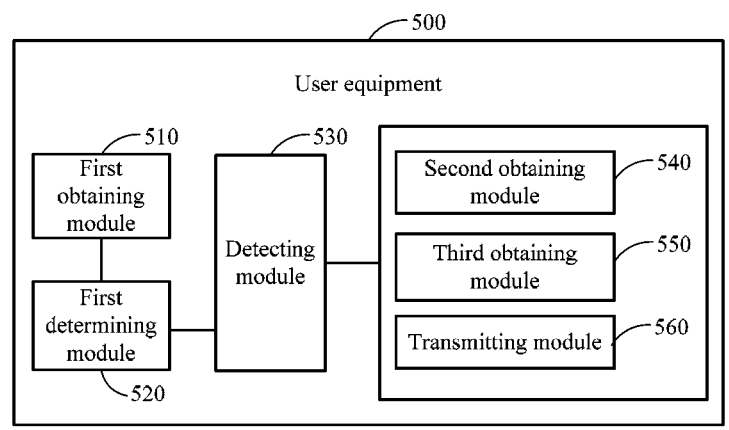
FIG. 8 is another schematic block diagram of a user equipment according to an embodiment of the present invention.

In the embodiment of the present invention, optionally, as shown in FIG. 8, the user equipment 500 further includes:

a second obtaining module 540, adapted to: when the detecting module 530 detects control signaling corresponding to the first DCI format, obtain identifier information included in the first DCI format, where the identifier information indicates a first state or a second state, the first state means that a data channel scheduled in the first DCI format uses a closed loop multi-input multi-output MIMO transmission manner, and the second state means that the data channel scheduled in the first DCI format uses a transmit diversity transmission manner or an open loop single-antenna-port transmission manner.

In the embodiment of the present invention, optionally, as shown in FIG. 8, the user equipment 500 further includes:

a third obtaining module 550, adapted to: if the identifier information obtained by the second obtaining module 540 indicates the second state, in at least one of a frequency-division distinguishing manner and a code-division distinguishing manner, obtain a user equipment-specific reference signal UERS used for the transmit diversity transmission manner.

In the embodiment of the present invention, optionally, the DCI format set determined by the first determining module 520 further includes a second DCI format, the second DCI format includes dual-codeword control information, and a data channel scheduled based on the second DCI format uses a closed loop MIMO transmission manner that is precoded based on channel information and inclusive of one or more layers.

In the embodiment of the present invention, optionally, the DCI format set determined by the first determining module 520 further includes a second DCI format, the second DCI format includes dual-codeword control information, and a data channel scheduled based on the first DCI format and the second DCI format uses a closed loop MIMO transmission manner that is precoded based on channel information and inclusive of one or more layers.

In the embodiment of the present invention, optionally, as shown in FIG. 8, the user equipment 500 further includes:

a transmitting module 560, adapted to: when the detecting module 530 detects the control signaling corresponding to the first DCI format, receive or send, according to antenna configuration information included in the first DCI format, the data channel scheduled in the first DCI format, where the data channel scheduled in the first DCI format uses the closed loop MIMO transmission manner, and the antenna configuration information includes at least one of codeword information, antenna port information, reference signal scrambling code identifier information, precoding matrix identifier information, and information about the number of space layers.

Optionally, the codeword information includes a codeword identifier, and the codeword identifier denotes a codeword number of data transmitted over the data channel scheduled in the first DCI format.

Figure 9:
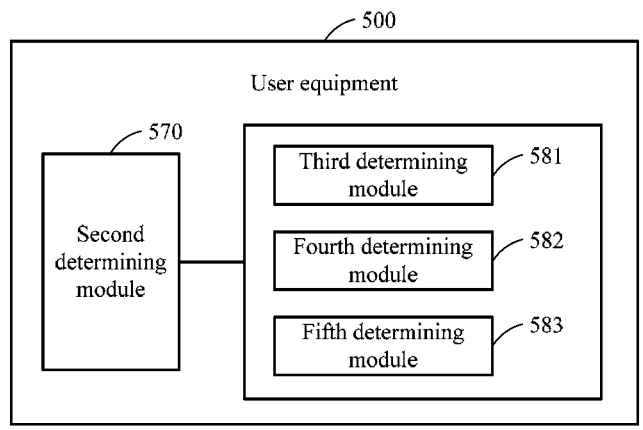
FIG. 9 is still another schematic block diagram of a user equipment according to an embodiment of the present invention.

In the embodiment of the present invention, optionally, as shown in FIG. 9, the user equipment 500 further includes:

a second determining module 570, adapted to determine, according to the control signaling corresponding to the first DCI format determined by the first determining module 520, that data transmitted over the data channel scheduled in the first DCI format is a retransmitted codeword; and a third determining module 581, adapted to: if the second determining module 570 determines that the data transmitted over the data channel scheduled in the first DCI format is a retransmitted codeword, determine, according to the antenna configuration information, that the number of layers occupied by the retransmitted codeword is greater than or equal to two layers, or that the number of layers occupied by the retransmitted codeword is equal to the number of layers occupied by an initially transmitted codeword corresponding to the retransmitted codeword; and/or a fourth determining module 582, adapted to: if the second determining module 570 determines that the data transmitted over the data channel scheduled in the first DCI format is a retransmitted codeword, determine, according to the antenna configuration information, that the retransmitted codeword uses a preconfigured antenna port, or that the retransmitted codeword uses a same antenna port as that of the initially transmitted codeword corresponding to the retransmitted codeword; and/or a fifth determining module 583, adapted to: if the second determining module 570 determines that the data transmitted over the data channel scheduled in the first DCI format is a retransmitted codeword, determine, according to the antenna configuration information, that the retransmitted codeword uses a preconfigured precoding matrix identifier.

In the embodiment of the present invention, optionally, the DCI format set determined by the first determining module 520 further includes a third DCI format. A data channel scheduled based on the third DCI format uses a transmission manner based on a transmit diversity or a transmission manner based on an open-loop single antenna port. Optionally, the DCI format is located in a common search space, that is, a search space in which at least two UEs need to perform a search. Optionally, the third DCI format may also be located in a UE-specific search space on an anchor carrier, but is not allowed to be located in a UE-specific search space on a supplementary carrier.

Specifically, the UE detects control signaling corresponding to the first DCI format and the second DCI format in the UE-specific search space. Further, the UE needs to detect, in the common search space and the UE-specific search space on the anchor carrier, control signaling corresponding to the third DCI format, and process a corresponding data channel according to the detected control signaling.

The foregoing embodiment can ensure that the number of times of blind detection performed by the UE for a PDCCH does not increase compared with an existing system, and that the implementation complexity of the UE does not increase.

The user equipment 500 according to the embodiments of the present invention may correspond to the user equipment in the control information transmission method according to the embodiments of the present invention, and the foregoing and other operations and/or functions of each module in the user equipment 500 are intended for implementing the corresponding procedure of the methods in FIG. 1 to FIG. 3, which, for brevity, are not repeated here any further.

According to the user equipment in the embodiment of the present invention, the identifier information included in the first DCI format can be used to indicate two transmission manners, or the DCI format set corresponding to the transmission mode includes the first DCI format and the second DCI format, where both the first DCI format and the second DCI format schedule the data channel that uses the closed loop MIMO transmission manner. Therefore, the data channel transmission mode corresponds to at least two transmission manners, which can enhance a control channel, reduce overhead of the control channel, improve system scheduling efficiency and flexibility, overcome the congestion problem of the control channel, and improve the utilization rate of control channel resources of a system.

Figure 10:
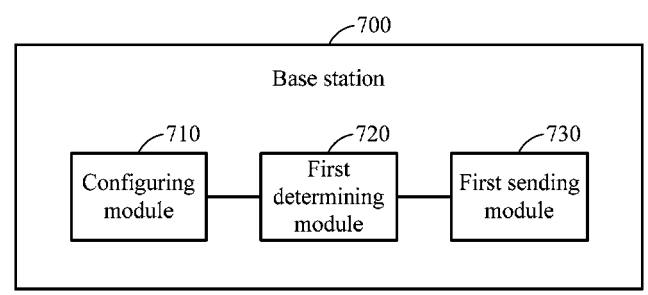
FIG. 10 is a schematic block diagram of a base station according to an embodiment of the present invention.

FIG. 10 shows a schematic block diagram of a base station 700 according to an embodiment of the present invention. As shown in FIG. 10, the base station 700 includes:

a configuring module 710, adapted to configure a data channel transmission mode;

a first determining module 720, adapted to determine a downlink control information DCI format set corresponding to the transmission mode configured by the configuring module 710, where the DCI format set includes a first DCI format, and the first DCI format includes single-codeword control information; and a first sending module 730, adapted to send, according to the DCI format set determined by the first determining module 720, control signaling corresponding to the DCI format set to the user equipment.

Because the data channel transmission mode corresponds to at least two transmission manners, the base station in the embodiment of the present invention can enhance a control channel, reduce overhead of the control channel, improve system scheduling efficiency and flexibility, overcome the congestion problem of the control channel, and improve the utilization rate of control channel resources of a system.

Figure 11:
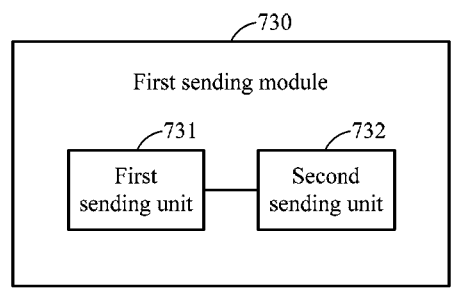
FIG. 11 is a schematic block diagram of a first sending module of a base station according to an embodiment of the present invention.

In the embodiment of the present invention, optionally, as shown in FIG. 11, the first sending module 730 includes:

a first sending unit 731, adapted to: if the first determining module 720 determines that a data channel scheduled in the first DCI format uses a closed loop multi-input multi-output MIMO transmission manner, send control signaling corresponding to the first DCI format that includes identifier information to the user equipment, where the identifier information indicates a first state; or a second sending unit 732, adapted to: if the first determining module 720 determines that a data channel scheduled in the first DCI format uses a transmit diversity transmission manner or an open loop single-antenna-port transmission manner, send control signaling corresponding to the first DCI format that includes identifier information to the user equipment, where the identifier information indicates a second state.

Figure 12:
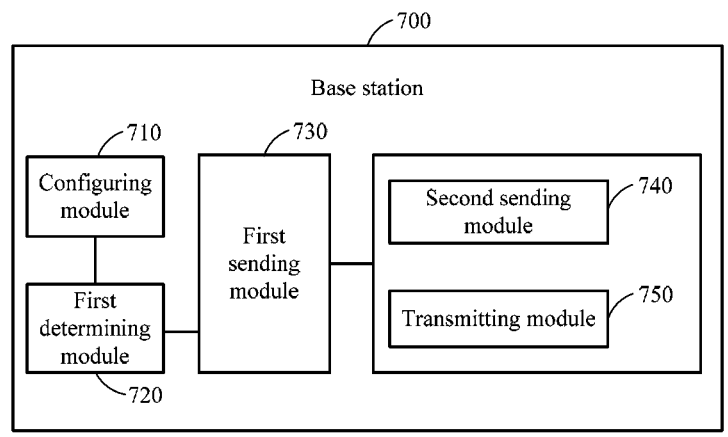
FIG. 12 is another schematic block diagram of a base station according to an embodiment of the present invention.

In the embodiment of the present invention, optionally, as shown in FIG. 12, the base station 700 further includes:

a second sending module 740, adapted to: if the first determining module 720 determines that the data channel scheduled in the first DCI format uses the transmit diversity transmission manner, in at least one of a frequency-division distinguishing manner and a code-division distinguishing manner, send a user equipment-specific reference signal UERS used for the transmit diversity transmission manner to the user equipment.

Optionally, the DCI format set determined by the first determining module 720 further includes a second DCI format, the second DCI format includes dual-codeword control information, and a data channel scheduled based on the second DCI format uses a closed loop MIMO transmission manner that is precoded based on channel information and inclusive of one or more layers.

In the embodiment of the present invention, optionally, the DCI format set determined by the first determining module 720 further includes a second DCI format, the second DCI format includes dual-codeword control information, and a data channel scheduled based on the first DCI format and the second DCI format uses a closed loop MIMO transmission manner that is precoded based on channel information and inclusive of one or more layers.

In the embodiment of the present invention, optionally, as shown in FIG. 12, the base station 700 further includes:

a transmitting module 750, adapted to: when the control signaling corresponding to the first DCI format determined by the first determining module 720 is sent to the user equipment, receive or send, according to antenna configuration information included in the first DCI format, the data channel scheduled in the first DCI format, where the data channel scheduled in the first DCI format uses the closed loop MIMO transmission manner, and the antenna configuration information includes at least one of codeword information, antenna port information, reference signal scrambling code identifier information, precoding matrix identifier information, and information about the number of space layers.

Optionally, the codeword information includes a codeword identifier, and the codeword identifier denotes a codeword number of data transmitted over the data channel scheduled in the first DCI format.

Figure 13:
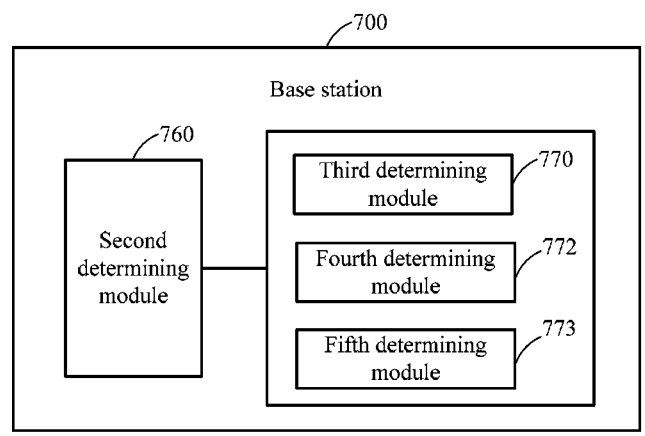
FIG. 13 is still another schematic block diagram of a base station according to an embodiment of the present invention.

In the embodiment of the present invention, optionally, as shown in FIG. 13, the base station 700 further includes:

a second determining module 760, adapted to determine that data transmitted over the data channel scheduled in the first DCI format determined by the first determining module 720 is a retransmitted codeword; and a third determining module 771, adapted to: if the second determining module 760 determines that the data transmitted over the data channel scheduled in the first DCI format is a retransmitted codeword, determine, according to the antenna configuration information, that the number of layers occupied by the retransmitted codeword is greater than or equal to two layers, or that the number of layers occupied by the retransmitted codeword is equal to the number of layers occupied by an initially transmitted codeword corresponding to the retransmitted codeword; and/or a fourth determining module 772, adapted to: if the second determining module 760 determines that the data transmitted over the data channel scheduled in the first DCI format is a retransmitted codeword, determine, according to the antenna configuration information, that the retransmitted codeword uses a preconfigured antenna port, or that the retransmitted codeword uses a same antenna port as that of the initially transmitted codeword corresponding to the retransmitted codeword; and/or a fifth determining module 773, adapted to: if the second determining module 760 determines that the data transmitted over the data channel scheduled in the first DCI format is a retransmitted codeword, determine, according to the antenna configuration information, that the retransmitted codeword uses a preconfigured precoding matrix identifier.

In the embodiment of the present invention, optionally, the DCI format set further includes a third DCI format. A data channel scheduled based on the third DCI format uses a transmission manner based on a transmit diversity or a transmission manner based on an open-loop single antenna port. Optionally, the DCI format is located in a common search space, that is, a search space in which at least two UEs need to perform a search. Optionally, the third DCI format may also be located in a UE-specific search space on an anchor carrier, but is not allowed to be located in a UE-specific search space on a supplementary carrier.

The base station 700 according to the embodiments of the present invention may correspond to the base station in the control information transmission method according to the embodiments of the present invention, and the foregoing and other operations and/or functions of each module in the base station 700 are intended for implementing the corresponding procedure of the methods in FIG. 4 to FIG. 6, which, for brevity, are not repeated here any further.

According to the base station in the embodiments of the present invention, the identifier information included in the first DCI format can be used to indicate two transmission manners, or the DCI format set corresponding to the transmission mode includes the first DCI format and the second DCI format, where both the first DCI format and the second DCI format schedule the data channel that uses the closed loop MIMO transmission manner. Therefore, the data channel transmission mode corresponds to at least two transmission manners, which can enhance a control channel, reduce overhead of the control channel, improve system scheduling efficiency and flexibility, overcome the congestion problem of the control channel, and improve the utilization rate of control channel resources of a system.

Embodiments of the present invention further provide an information transmission method, a user equipment, and a base station, which can overcome the congestion problem of a control channel and improve the utilization rate of system resources.

According to one aspect, an embodiment of the present invention provides an information transmission method, where the method includes: determining a downlink control information DCI format set used to detect control signaling, where the DCI format set includes a first DCI format and a second DCI format, first control signaling corresponding to the first DCI format includes identifier information that indicates a first state or a second state, the first state means that the first control signaling is used to schedule transmission of a data channel of a user equipment, and the second state means that the first control signaling is used to indicate resource information of second control signaling corresponding to the second DCI format; and detecting the first control signaling and the second control signaling according to the DCI format set and a preset rule.

Optionally, the detecting the first control signaling and the second control signaling includes: detecting the second control signaling according to control information in the first control signaling if the first control signaling is detected and the identifier information included in the first control signaling indicates the second state.

Optionally, the control information includes information about a control channel element CCE resource or a resource block RB resource occupied by the second control signaling, where the CCE resource does not belong to a search space of the user equipment, and the RB resource is not a resource of the second control signaling notified by a base station by using radio resource control RRC signaling.

Optionally, the first DCI format is a rollback scheduling DCI format.

Optionally, the second control signaling is based on a cell-specific reference signal CRS or a user equipment-specific reference signal UERS.

Optionally, the preset rule is predefined, or is notified by using the RRC signaling.

Optionally, the method further includes: if the first control signaling is detected and the identifier information indicates the second state but the second control signaling is not detected, sending acknowledge ACK information corresponding to the first control signaling to the base station, where a channel resource that bears the ACK information corresponds to a channel resource of the first control signaling.

Optionally, the method further includes: if the first control signaling is detected, the identifier information indicates the second state, and the second control signaling is detected, sending acknowledge ACK/non-acknowledge NACK information corresponding to data scheduled in the second control signaling to the base station, where a channel resource that bears the ACK/NACK information corresponds to a channel resource of the second control signaling.

According to another aspect, an embodiment of the present invention provides an information transmission method, where the method includes: determining a downlink control information DCI format set used by a user equipment to detect control signaling, where the DCI format set includes a first DCI format and a second DCI format, first control signaling corresponding to the first DCI format includes identifier information that indicates a first state or a second state, the first state means that the first control signaling is used to schedule transmission of a data channel of the user equipment, and the second state means that the first control signaling is used to indicate resource information of second control signaling corresponding to the second DCI format; and sending the first control signaling and/or the second control signaling to the user equipment.

Optionally, the sending the first control signaling and/or the second control signaling to the user equipment includes: sending the first control signaling and the second control signaling to the user equipment, where the identifier information included in the first control signaling indicates the second state, and control information in the first control signaling is resource information of the second control signaling.

Optionally, the control information includes information about a control channel element CCE resource or a resource block RB resource occupied by the second control signaling, where the CCE resource does not belong to a search space of the user equipment, and the RB resource is not a resource of the second control signaling notified by a base station by using radio resource control RRC signaling.

Optionally, the method further includes: when sending the first control signaling and the second control signaling to the user equipment, detecting the ACK/NACK information sent by the user equipment, on ACK/NACK resources corresponding to the first control signaling and the second control signaling respectively.

Optionally, the first DCI format is a rollback scheduling DCI format.

Optionally, the second control signaling is based on a cell-specific reference signal CRS or a user equipment-specific reference signal UERS.

According to still another aspect, an embodiment of the present invention provides a user equipment, where the user equipment includes: a determining module, adapted to determine a downlink control information DCI format set used to detect control signaling, where the DCI format set includes a first DCI format and a second DCI format, first control signaling corresponding to the first DCI format includes identifier information that indicates a first state or a second state, the first state means that the first control signaling is used to schedule transmission of a data channel of the user equipment, and the second state means that the first control signaling is used to indicate resource information of second control signaling corresponding to the second DCI format; and a detecting module, adapted to detect the first control signaling and the second control signaling according to the DCI format set determined by the determining module and a preset rule.

Optionally, the detecting module is further adapted to detect the second control signaling according to control information in the first control signaling if the first control signaling is detected and the identifier information included in the first control signaling indicates the second state.

Optionally, the control information in the first control signaling detected by the detecting module includes information about a control channel element CCE resource or a resource block RB resource occupied by the second control signaling, where the CCE resource does not belong to a search space of the user equipment, and the RB resource is not a resource of the second control signaling notified by a base station by using radio resource control RRC signaling.

Optionally, the first DCI format in the DCI format set determined by the determining module is a rollback scheduling DCI format.

Optionally, the second control signaling detected by the detecting module is based on a cell-specific reference signal CRS or a user equipment-specific reference signal UERS.

Optionally, the preset rule applied to the detecting module is predefined, or is notified by using the RRC signaling.

Optionally, the user equipment further includes a first sending module, adapted to: if the first control signaling is detected and the identifier information indicates the second state but the second control signaling is not detected, send acknowledge ACK information corresponding to the first control signaling to the base station, where a channel resource that bears the ACK information corresponds to a channel resource of the first control signaling.

Optionally, the user equipment further includes a second sending module, adapted to: if the first control signaling is detected, the identifier information indicates the second state, and the second control signaling is detected, send acknowledge ACK/non-acknowledge NACK information corresponding to data scheduled in the second control signaling to the base station, where a channel resource that bears the ACK/NACK information corresponds to a channel resource of the second control signaling.

According to still another aspect, an embodiment of the present invention provides a base station, where the base station includes: a determining module, adapted to determine a downlink control information DCI format set used by a user equipment to detect control signaling, where the DCI format set includes a first DCI format and a second DCI format, first control signaling corresponding to the first DCI format includes identifier information that indicates a first state or a second state, the first state means that the first control signaling is used to schedule transmission of a data channel of the user equipment, and the second state means that the first control signaling is used to indicate resource information of second control signaling corresponding to the second DCI format; and a sending module, adapted to send the first control signaling and/or the second control signaling corresponding to the DCI format set determined by the determining module to the user equipment.

Optionally, the sending module is further adapted to send the first control signaling and the second control signaling to the user equipment, where the identifier information included in the first control signaling indicates the second state, and control information in the first control signaling is resource information of the second control signaling.

Optionally, the control information in the first control signaling sent by the sending module includes information about a control channel element CCE resource or a resource block RB resource occupied by the second control signaling, where the CCE resource does not belong to a search space of the user equipment, and the RB resource is not a resource of the second control signaling notified by a base station by using radio resource control RRC signaling.

Optionally, the base station further includes a receiving module, adapted to: when sending the first control signaling and the second control signaling to the user equipment, detect the ACK/NACK information sent by the user equipment, on ACK/NACK resources corresponding to the first control signaling and the second control signaling respectively.

Optionally, the first DCI format in the DCI format set determined by the determining module is a rollback scheduling DCI format.

Optionally, the second control signaling sent by the sending module is based on a cell-specific reference signal CRS or a user equipment-specific reference signal UERS.

Based on the foregoing technical solutions, in the information transmission method, the user equipment, and the base station in the embodiments of the present invention, the control signaling includes the identifier information that indicates the first state or the second state, so as to indicate that the control signaling is used to schedule transmission of a data channel or schedule transmission of another control channel. In this way, the control information can be transmitted in a multi-level scheduling manner, which can enhance the control channel, improve system scheduling efficiency and flexibility, overcome the congestion problem of the control channel, and improve the utilization rate of system resources.

The following describes the method, the user equipment, and the base station according to the embodiments of the present invention in detail with reference to FIG. 14 to FIG. 21.

Figure 14:
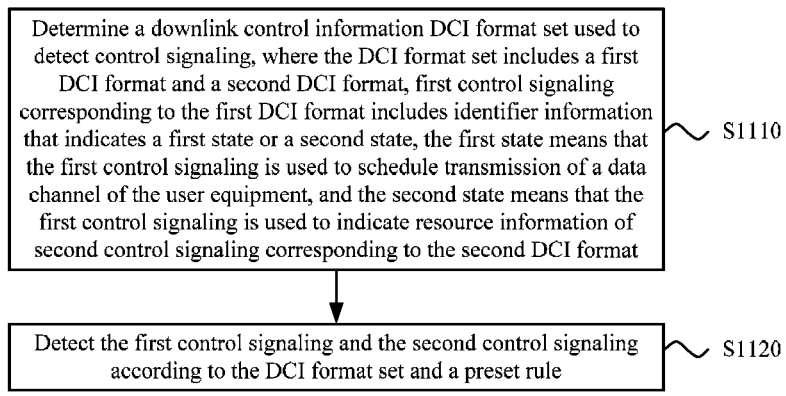
FIG. 14 is a schematic flowchart of an information transmission method according to still another embodiment of the present invention.

FIG. 14 shows a schematic flowchart of an information transmission method according to an embodiment of the present invention. As shown in FIG. 14, the method includes:

S1110. Determine a downlink control information DCI format set used to detect control signaling, where the DCI format set includes a first DCI format and a second DCI format, first control signaling corresponding to the first DCI format includes identifier information that indicates a first state or a second state, the first state means that the first control signaling is used to schedule transmission of a data channel of a user equipment, and the second state means that the first control signaling is used to indicate resource information of second control signaling corresponding to the second DCI format.

S1120. Detect the first control signaling and the second control signaling according to the DCI format set and a preset rule.

Therefore, in the information transmission method in the embodiment of the present invention, the control signaling includes the identifier information that indicates the first state or the second state, so as to indicate that the control signaling is used to schedule transmission of a data channel or schedule transmission of another control channel. In this way, the control information can be transmitted in a multi-level scheduling manner, which can enhance the control channel, improve system scheduling efficiency and flexibility, overcome the congestion problem of the control channel, and improve the utilization rate of system resources.

In S1110, the UE may determine, according to a data channel transmission mode configured by the base station, a downlink control information (Downlink Control Information, "DCI" for short) format set to be detected. The DCI format set may include the first DCI format and the second DCI format, the first control signaling corresponding to the first DCI format includes the identifier information that indicates the first state or the second state, the first state means that the first control signaling is used to schedule transmission of the data channel of the user equipment, and the second state means that the first control signaling is used to indicate the resource information of the second control signaling corresponding to the second DCI format. For example, if a physical downlink shared channel (Physical Downlink Shared Channel, "PDCCH" for short) transmission mode configured by the base station is a closed loop multi-input multi-output (Multiple Input Multiple Output, "MIMO" for short) mode, the DCI format set corresponding to the mode includes a DCI format 2C and a DCI format 1A.

Optionally, in the embodiments of the present invention, the first DCI format is a rollback scheduling DCI format. For example, a data channel scheduled by a PDCCH corresponding to the first DCI format uses a transmit diversity transmission manner or an open loop single-antenna-port transmission manner. For example, the DCI format 1A is a rollback format. Specifically, a data channel scheduled by a PDCCH corresponding to the DCI format 1A uses the transmit diversity transmission manner or the open loop single-antenna-port transmission manner.

Optionally, in the embodiments of the present invention, the identifier information included in the first control signaling may be a bit, a scrambling code, or other time-frequency resource information. The following uses bit as an example for description. The identifier information may be a newly added bit, an existing bit, or a bit combination, or may be a part of states of an existing bit such as a part of states of a resource allocation bit, or a part of states of an existing bit combination.

For example, when the bit is "0", it indicates that the identifier information indicates the first state, that is, the first control signaling is used to schedule transmission of the data channel of the UE, that is, the data channel uses the transmit diversity transmission manner or the open loop single-antenna-port transmission manner; and, when the bit is "1", it indicates that the identifier information indicates the second state, that is, the first control signaling is used to indicate the resource information of the second control signaling corresponding to the second DCI format. Understandably, the bit "1" may also indicate the first state, and the bit "0" may also indicate the second state, wand the embodiments of the present invention are not limited thereto.

In S1120, the user equipment detects the first control signaling and the second control signaling according to the DCI format set and the preset rule. The UE may determine a location of a search space according to a CCE level and the UE's own scrambling code, and detect the DCI format 1A in the search space. When it is detected that a bit serving as the identifier information in the DCI format 1A is the first state such as "0", it indicates that the PDCCH corresponding to the DCI format 1A is used to schedule transmission of the data channel of the UE, that is, the data channel uses the transmit diversity mode or the open loop single-antenna-port mode. Meanwhile, the UE also detects the DCI format 2C in the search space. If the DCI format 2C is detected, the UE receives data according to control information in the DCI format 2C.

Optionally, the UE detects the second control signaling according to the control information in the first control signaling if the first control signaling is detected by the UE and the identifier information included in the first control signaling indicates the second state.

Optionally, in the embodiment of the present invention, the control information in the first control signaling includes information about a control channel element CCE resource or a resource block RB resource occupied by the second control signaling, where the CCE resource does not belong to a search space of the user equipment, and the RB resource is not a resource of the second control signaling notified by a base station by using radio resource control RRC signaling.

Optionally, in the embodiment of the present invention, the second control signaling is based on a cell-specific reference signal (Cell-specific Reference Signal, "CRS" for short) or a user equipment-specific reference signal (UE-specific Reference Signal, "UERS" for short).

Optionally, the preset rule is predefined, or is notified by using the RRC signaling. Specifically, the preset rule may be predefined and does not need to be notified by using signaling. For example, the UE determines the location of the search space according to the CCE level and the UE's own scrambling code. In this way, the UE detects a PDCCH corresponding to the first DCI format and the second DCI format in the search space. In addition, the preset rule may also be notified by using radio resource control (Radio Resource Control, "RRC" for short) signaling. For example, the base station configures a resource location of a PDCCH corresponding to the second DCI format by using the RRC signaling, and the UE detects the PDCCH corresponding to the second DCI format according to the resource location that is notified by using the RRC signaling.

For example, in some scenarios, a search space of a DCI format 2C of a specific CCE level determined by the base station does not include the location of the UE. For example, a search space of a CCE level 4 includes no location for scheduling the UE. In this case, it may be considered to increase the CCE level to 8 to check whether a search space of the level 8 includes the location. However, if a DCI format 2C of the level 8 is used for scheduling, the overhead of the PDCCH is high, and in this case, the level 4 is enough for fulfilling performance of the DCI format 2C. In this case, four continuous CCEs in a PDCCH resource area are still available (although they are not in the search space of the UE). Therefore, the DCI format 1A may be selected and sent to the UE. A bit serving as the identifier information in the DCI format 1A is set to "1", indicating that the PDCCH corresponding to the DCI format 1A is used to indicate information about a resource occupied by a PDCCH corresponding to the DCI format 2C. The location of the resource is the location of the idle CCE level 4. The UE detects the PDCCH corresponding to the DCI format 2C according to the control information in the DCI format 1A.

The idle CCE resource may be indicated based on a modulus CCE level 0 as a start point. For example, if the PDCCH resource area includes 80 CCEs in total, 80/4=20 CCE levels 4 may be included, whose start points are CCEs numbered 0, 4, 8, 12, . . . , 76 respectively. In this case, 5 bits are required for specific indication. Other CCE levels are indicated in a similar way. By analogy, the idle CCE resource indication method may also be indicated not based on the modulo CCE level 0 as a start point. That is to say, any continuous CCE resources can be used as CCE resources of a desired aggregation level. In this case, for each CCE level, there are 80 possibilities. That is to say, there are 320 possibilities in total, and 9 bits are required for specific indication. By analogy, the idle CCE resource may also be indicated by removing a PDCCH candidate location in the search space of the UE, which can further save the required indication bits.

Figure 15:
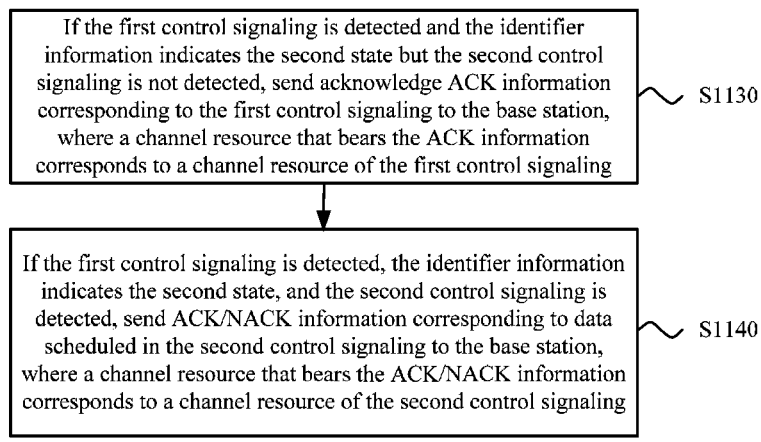
FIG. 15 is another schematic flowchart of an information transmission method according to still another embodiment of the present invention.

Optionally, in the embodiment of the present invention, as shown in FIG. 15, the method may further include:

S1130. If the first control signaling is detected and the identifier information indicates the second state but the second control signaling is not detected, send acknowledge ACK information corresponding to the first control signaling to the base station, where a channel resource that bears the ACK information corresponds to a channel resource of the first control signaling.

S1140. If the first control signaling is detected, the identifier information indicates the second state, and the second control signaling is detected, send acknowledge ACK/non-acknowledge NACK information corresponding to data scheduled in the second control signaling to the base station, where a channel resource that bears the ACK/NACK information corresponds to a channel resource of the second control signaling.

Specifically, for example, if the UE receives the PDCCH corresponding to the first DCI format and the identifier information indicates the second state but the UE detects no PDCCH corresponding to the second DCI format, the UE may feed back ACK acknowledge information corresponding to the PDCCH corresponding to the first DCI format, where a channel resource that bears the ACK information corresponds to a resource of the PDCCH corresponding to the first DCI format. Alternatively, if the UE receives the PDCCH corresponding to the first DCI format, the identifier information indicates the second state, and the UE detects the PDCCH corresponding to the second DCI format, the UE feeds back, according to downlink data scheduled by the PDCCH corresponding to the second DCI format, acknowledge ACK/non-acknowledge NACK information corresponding to the downlink data, where a channel resource that bears the ACK/NACK information corresponds to the resource of the PDCCH corresponding to the second DCI format. Therefore, the base station can identify whether the UE detects the two PDCCHs correctly, and adjust the sending manner accurately to improve system performance.

In the information transmission method in the embodiment of the present invention, the control signaling includes the identifier information that indicates the first state or the second state, so as to indicate that the control signaling is used to schedule transmission of a data channel or schedule transmission of another control channel. In this way, the control information can be transmitted in a multi-level scheduling manner, which can enhance the control channel, improve system scheduling efficiency and flexibility, overcome the congestion problem of the control channel, and improve the utilization rate of system resources.

The LTE system of subsequent versions will introduce UERS-based PDCCH (U-PDCCH for short), and specifically, perform closed loop MIMO precoding processing for the PDCCH, and use precoding gain to improve performance of the PDCCH and further reduce the PDCCH overhead. The U-PDCCH is located in a non PDCCH resource area of an existing LTE system, that is, located in a PDSCH area. A resource location of a U-PDCCH of the UE, that is, an occupied RB, is notified by the base station to the UE by using RRC signaling, and therefore, no dynamic scheduling gain can be obtained. That is to say, at a specific time, if the resource notified by using the RRC has poor performance for transmitting the U-PDCCH, the scheduling may be considered to be performed only in a rollback format. The method in the embodiments of the present invention can solve the problem. That is to say, when the resource of the U-PDCCH notified by using the RRC signaling is not suitable, the base station may schedule a rollback format such as the DCI format 1A for the UE. The identifier information in the DCI format is the second state, which means that the DCI format 1A indicates a non-rollback DCI format such as the DCI format 2C. The corresponding resource of the U-PDCCH may fall outside the resources notified by using the RRC signaling. The specific indication method is described in the foregoing embodiment. In this way, the dynamic scheduling gain of the U-PDCCH can be provided without performing rollback scheduling.

Figure 16:
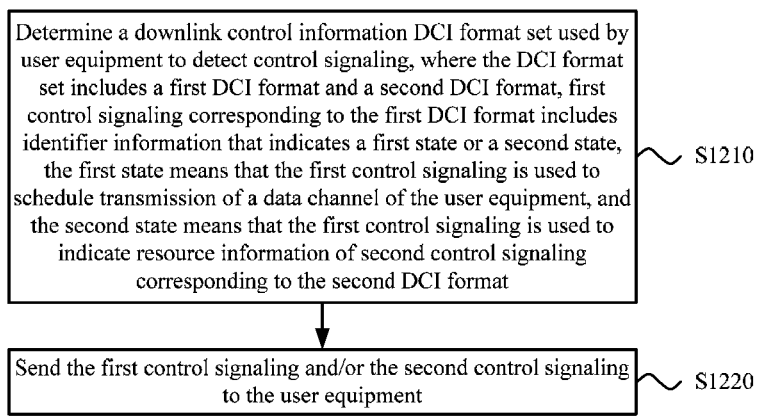
FIG. 16 is still another schematic flowchart of an information transmission method according to still another embodiment of the present invention.
Figure 17:
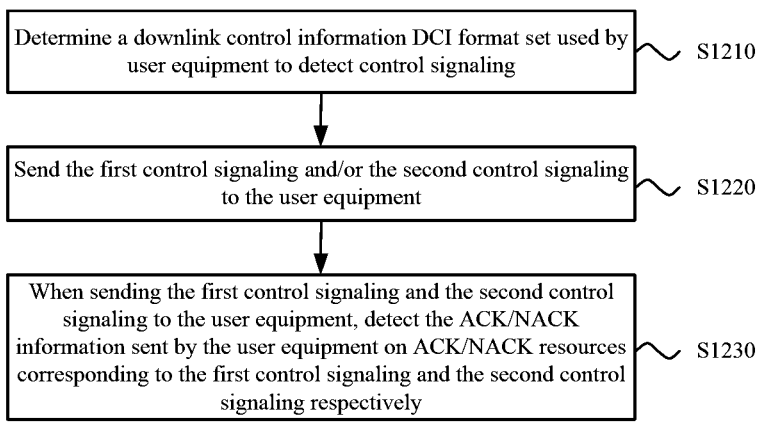
FIG. 17 is still another schematic flowchart of an information transmission method according to still another embodiment of the present invention.

The foregoing has described the information transmission method according to the embodiments of the present invention in detail from a perspective of the user equipment with reference to FIG. 14 and FIG. 15, and the following describes the control information transmission method according to the embodiments of the present invention in detail from a perspective of the base station with reference to FIG. 16 and FIG. 17.

FIG. 16 shows a schematic flowchart of an information transmission method according to an embodiment of the present invention. As shown in FIG. 16, the method includes:

S1210. Determine a downlink control information DCI format set used by a user equipment to detect control signaling, where the DCI format set includes a first DCI format and a second DCI format, first control signaling corresponding to the first DCI format includes identifier information that indicates a first state or a second state, the first state means that the first control signaling is used to schedule transmission of a data channel of the user equipment, and the second state means that the first control signaling is used to indicate resource information of second control signaling corresponding to the second DCI format.

S1220. Send the first control signaling and/or the second control signaling to the user equipment.

In S1210, optionally, the control information includes information about a control channel element CCE resource or a resource block RB resource occupied by the second control signaling, where the CCE resource does not belong to a search space of the user equipment, and the RB resource is not a resource of the second control signaling notified by a base station by using radio resource control RRC signaling.

Optionally, the first DCI format is a rollback scheduling DCI format. Optionally, the second control signaling is based on a cell-specific reference signal CRS or a user equipment-specific reference signal UERS. Optionally, the identifier information may be a bit, scrambling code or other time-frequency resource information.

In S1220, optionally, the base station sends the first control signaling and the second control signaling to the user equipment, where the identifier information included in the first control signaling indicates the second state, and control information in the first control signaling is resource information of the second control signaling.

In the embodiment of the present invention, optionally, as shown in FIG. 17, the method further includes:

S1230. When sending the first control signaling and the second control signaling to the user equipment, the base station detects the ACK/NACK information sent by the user equipment, on ACK/NACK resources corresponding to the first control signaling and the second control signaling respectively.

Understandably, in the embodiment of the present invention, the interaction between the user equipment and the base station as well as relevant features and functions, and so on, which are described from the perspective of the user equipment side, correspond to those described from the perspective of the base station side, and, for brevity, are not repeated here any further.

Therefore, in the information transmission method in the embodiment of the present invention, the control signaling includes the identifier information that indicates the first state or the second state, so as to indicate that the control signaling is used to schedule transmission of a data channel or schedule transmission of another control channel. In this way, the control information can be transmitted in a multi-level scheduling manner, which can enhance the control channel, improve system scheduling efficiency and flexibility, overcome the congestion problem of the control channel, and improve the utilization rate of system resources.

The foregoing has described the control information transmission method according to the embodiments of the present invention in detail with reference to FIG. 14 to FIG. 17, and the following describes the user equipment and the base station according to the embodiments of the present invention in detail with reference to FIG. 18 to FIG. 21.

Figure 18:
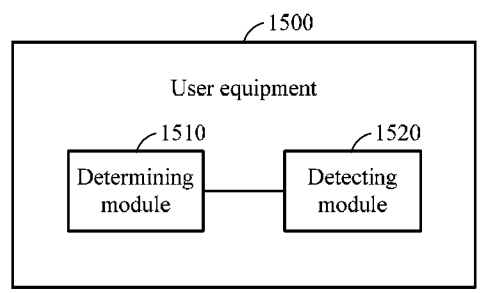
FIG. 18 is a schematic block diagram of a user equipment according to another embodiment of the present invention.

FIG. 18 shows a schematic block diagram of a user equipment 1500 according to an embodiment of the present invention. As shown in FIG. 18, the user equipment 1500 includes:

a determining module 1510, adapted to determine a downlink control information DCI format set used to detect control signaling, where the DCI format set includes a first DCI format and a second DCI format, first control signaling corresponding to the first DCI format includes identifier information that indicates a first state or a second state, the first state means that the first control signaling is used to schedule transmission of a data channel of the user equipment, and the second state means that the first control signaling is used to indicate resource information of second control signaling corresponding to the second DCI format; and a detecting module 1520, adapted to detect the first control signaling and the second control signaling according to the DCI format set determined by the determining module 1510 and a preset rule.

According to the user equipment in the embodiment of the present invention, the control signaling includes the identifier information that indicates the first state or the second state, so as to indicate that the control signaling is used to schedule transmission of a data channel or schedule transmission of another control channel. In this way, the control information can be transmitted in a multi-level scheduling manner, which can enhance the control channel, improve system scheduling efficiency and flexibility, overcome the congestion problem of the control channel, and improve the utilization rate of system resources.

Optionally, the detecting module 1520 is further adapted to detect the second control signaling according to control information in the first control signaling if the first control signaling is detected and the identifier information included in the first control signaling indicates the second state.

Optionally, the control information in the first control signaling detected by the detecting module 1520 includes information about a control channel element CCE resource or a resource block RB resource occupied by the second control signaling, where the CCE resource does not belong to a search space of the user equipment, and the RB resource is not a resource of the second control signaling notified by a base station by using radio resource control RRC signaling.

Optionally, the first DCI format in the DCI format set determined by the determining module 1510 is a rollback scheduling DCI format.

Optionally, the second control signaling detected by the detecting module 1520 is based on a cell-specific reference signal CRS or a user equipment-specific reference signal UERS.

Optionally, the preset rule applied to the detecting module 1520 is predefined, or is notified by using the RRC signaling.

Figure 19:
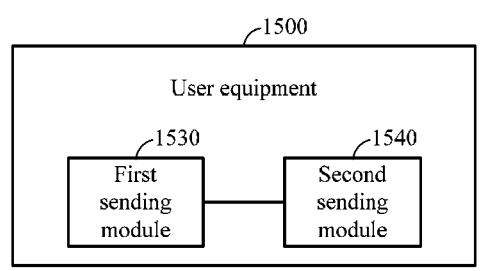
FIG. 19 is another schematic block diagram of a user equipment according to another embodiment of the present invention.

In the embodiment of the present invention, as shown in FIG. 19, optionally, the user equipment 1500 further includes:

a first sending module 1530, adapted to: if the first control signaling is detected and the identifier information indicates the second state but the second control signaling is not detected, send acknowledge ACK information corresponding to the first control signaling to the base station, where a channel resource that bears the ACK information corresponds to a channel resource of the first control signaling.

Optionally, as shown in FIG. 19, the user equipment 1500 further includes:

a second sending module 1540, adapted to: if the first control signaling is detected, the identifier information indicates the second state, and the second control signaling is detected, send acknowledge ACK/non-acknowledge NACK information corresponding to data scheduled in the second control signaling to the base station, where a channel resource that bears the ACK/NACK information corresponds to a channel resource of the second control signaling.

The user equipment 1500 according to the embodiments of the present invention may correspond to the user equipment in the information transmission method according to the embodiments of the present invention, and the foregoing and other operations and/or functions of each module in the user equipment 1500 are intended for implementing the corresponding procedure of the methods in FIG. 14 to FIG. 17, which, for brevity, are not repeated here any further.

According to the user equipment in the embodiment of the present invention, the control signaling includes the identifier information that indicates the first state or the second state, so as to indicate that the control signaling is used to schedule transmission of a data channel or schedule transmission of another control channel. In this way, the control information can be transmitted in a multi-level scheduling manner, which can enhance the control channel, improve system scheduling efficiency and flexibility, overcome the congestion problem of the control channel, and improve the utilization rate of system resources.

Figure 20:
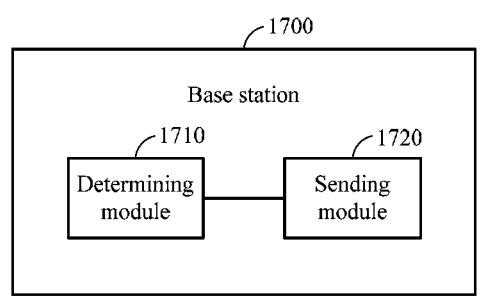
FIG. 20 is a schematic block diagram of a base station according to another embodiment of the present invention.

FIG. 20 shows a schematic block diagram of a base station 1700 according to an embodiment of the present invention. As shown in FIG. 20, the base station 1700 includes:

a determining module 1710, adapted to determine a downlink control information DCI format set used by a user equipment to detect control signaling, where the DCI format set includes a first DCI format and a second DCI format, first control signaling corresponding to the first DCI format includes identifier information that indicates a first state or a second state, the first state means that the first control signaling is used to schedule transmission of a data channel of the user equipment, and the second state means that the first control signaling is used to indicate resource information of second control signaling corresponding to the second DCI format; and a sending module 1720, adapted to send the first control signaling and/or the second control signaling corresponding to the DCI format set determined by the determining module 1710 to the user equipment.

In the embodiment of the present invention, optionally, the sending module 1720 is further adapted to send the first control signaling and the second control signaling to the user equipment, where the identifier information included in the first control signaling indicates the second state, and control information in the first control signaling is resource information of the second control signaling.

In the embodiment of the present invention, optionally, the control information in the first control signaling sent by the sending module 1720 includes information about a control channel element CCE resource or a resource block RB resource occupied by the second control signaling, where the CCE resource does not belong to a search space of the user equipment, and the RB resource is not a resource of the second control signaling notified by a base station by using radio resource control RRC signaling.

Figure 21:
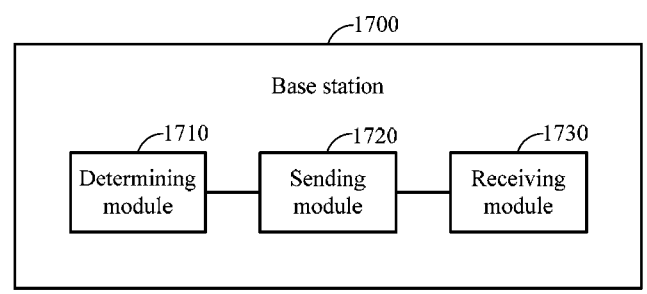
FIG. 21 is another schematic block diagram of a base station according to another embodiment of the present invention.

In the embodiment of the present invention, as shown in FIG. 21, optionally, the base station 1700 further includes:

a receiving module 1730, adapted to: when sending the first control signaling and the second control signaling to the user equipment, detect the ACK/NACK information sent by the user equipment, on ACK/NACK resources corresponding to the first control signaling and the second control signaling respectively.

In the embodiment of the present invention, optionally, the first DCI format in the DCI format set determined by the determining module 1710 is a rollback scheduling DCI format.

In the embodiment of the present invention, optionally, the second control signaling sent by the sending module 1720 is based on a cell-specific reference signal CRS or a user equipment-specific reference signal UERS.

The base station 1700 according to the embodiments of the present invention may correspond to the base station in the information transmission method according to the embodiments of the present invention, and the foregoing and other operations and/or functions of each module in the base station 1700 are intended for implementing the corresponding procedure of the methods in FIG. 14 to FIG. 17, which, for brevity, are not repeated here any further.

According to the base station in the embodiment of the present invention, the control signaling includes the identifier information that indicates the first state or the second state, so as to indicate that the control signaling is used to schedule transmission of a data channel or schedule transmission of another control channel. In this way, the control information can be transmitted in a multi-level scheduling manner, which can enhance the control channel, improve system scheduling efficiency and flexibility, overcome the congestion problem of the control channel, and improve the utilization rate of system resources.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected to achieve the objective of the solution of the embodiment of the present invention according to actual needs.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any mediums that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any equivalent modification or replacement readily figured out by a person skilled in the art within the technical scope of the present invention shall fall within the protection scope of the present invention. Therefore, the protection scope of the present invention shall be subject to the protection scope of the claims.

What is claimed is:

1. A control information transmission method, comprising:
obtaining a data channel transmission mode configured by a base station;
determining a downlink control information (DCI) format set corresponding to the transmission mode, wherein the DCI format set comprises a first DCI format, and the first DCI format comprises single-codeword control information;
detecting, according to the DCI format set, control signaling sent by the base station and corresponding to the DCI format set;
when the control signaling corresponding to the first DCI format is detected, receiving or sending, according to antenna configuration information comprised in the first DCI format, the data channel scheduled in the first DCI format, wherein the data channel scheduled in the first DCI format uses a closed loop MIMO transmission manner, and the antenna configuration information comprises at least one of codeword information, antenna port information, reference signal scrambling code identifier information, precoding matrix identifier information, and information about the number of space layers;
determining, according to the control signaling corresponding to the first DCI format, that data transmitted over the data channel scheduled in the first DCI format is a retransmitted codeword; and
determining, according to the antenna configuration information, that the number of layers occupied by the retransmitted codeword is greater than or equal to two layers, or that the number of layers occupied by the retransmitted codeword is equal to the number of layers occupied by an initially transmitted codeword corresponding to the retransmitted codeword,
wherein the DCI format set further comprises a second DCI format, the second DCI format comprises dual-codeword control information, and a data channel scheduled based on the first DCI format and the second DCI format uses a closed loop MIMO transmission manner that is precoded based on channel information and comprised of one or more layers.

2. The method according to claim 1, wherein the codeword information comprises a codeword identifier, and the codeword identifier denotes a codeword number of data transmitted over the data channel scheduled in the first DCI format.

3. A control information transmission method, comprising:
configuring a data channel transmission mode;
determining a downlink control information (DCI) format set corresponding to the transmission mode, wherein the DCI format set comprises a first DCI format, and the first DCI format comprises single-codeword control information;
sending, according to the DCI format set, control signaling corresponding to the DCI format set to a user equipment;
when the control signaling corresponding to the first DCI format is sent to the user equipment, receiving or sending, according to antenna configuration information comprised in the first DCI format, the data channel scheduled in the first DCI format, wherein the data channel scheduled in the first DCI format uses a closed loop MIMO transmission manner, and the antenna configuration information comprises at least one of codeword information, antenna port information, reference signal scrambling code identifier information, precoding matrix identifier information, and information about the number of space layers;
determining that data transmitted over the data channel scheduled in the first DCI format is a retransmitted codeword; and
determining, according to the antenna configuration information, that the number of layers occupied by the retransmitted codeword is greater than or equal to two layers, or that the number of layers occupied by the retransmitted codeword is equal to the number of layers occupied by an initially transmitted codeword corresponding to the retransmitted codeword,
wherein the DCI format set further comprises a second DCI format, the second DCI format comprises dual-codeword control information, and a data channel scheduled based on the first DCI format and the second DCI format uses a closed loop MIMO transmission manner that is precoded based on channel information and comprised of one or more layers.

4. A user equipment, comprising:
a first obtaining module, adapted to obtain a data channel transmission mode configured by a base station;
a first determining module, adapted to determine a downlink control information (DCI) format set corresponding to the transmission mode obtained by the first obtaining module, wherein the DCI format set comprises a first DCI format, and the first DCI format comprises single-codeword control information;
a detecting module, adapted to detect, according to the DCI format set determined by the first determining module, control signaling sent by the base station and corresponding to the DCI format set;
a transmitting module, adapted to: when the detecting module detects the control signaling corresponding to the first DCI format, receive or send, according to antenna configuration information comprised in the first DCI format, the data channel scheduled in the first DCI format, wherein the data channel scheduled in the first DCI format uses a closed loop MIMO transmission manner, and the antenna configuration information comprises at least one of codeword information, antenna port information, reference signal scrambling code identifier information, precoding matrix identifier information, and information about the number of space layers;
a second determining module, adapted to determine, according to the control signaling corresponding to the first DCI format determined by the first determining module, that data transmitted over the data channel scheduled in the first DCI format is a retransmitted codeword; and
a third determining module, adapted to: if the second determining module determines that the data transmitted over the data channel scheduled in the first DCI format is a retransmitted codeword, determine, according to the antenna configuration information, that the number of layers occupied by the retransmitted codeword is greater than or equal to two layers, or that the number of layers occupied by the retransmitted codeword is equal to the number of layers occupied by an initially transmitted codeword corresponding to the retransmitted codeword,
wherein the DCI format set determined by the first determining module further comprises a second DCI format, the second DCI format comprises dual-codeword control information, and a data channel scheduled based on the first DCI format and the second DCI format uses a closed loop MIMO transmission manner that is precoded based on channel information and comprised of one or more layers.

5. The user equipment according to claim 4, wherein the codeword information comprises a codeword identifier, and the codeword identifier denotes a codeword number of data transmitted over the data channel scheduled in the first DCI format.

6. A base station, comprising:
a configuring module, adapted to configure a data channel transmission mode;
a first determining module, adapted to determine a downlink control information (DCI) format set corresponding to the transmission mode configured by the configuring module, wherein the DCI format set comprises a first DCI format, and the first DCI format comprises single-codeword control information; and
a first sending module, adapted to send, according to the DCI format set determined by the first determining module, control signaling corresponding to the DCI format set to a user equipment;
a transmitting module, adapted to: when the control signaling corresponding to the first DCI format determined by the first determining module is sent to the user equipment, receive or send, according to antenna configuration information comprised in the first DCI format, the data channel scheduled in the first DCI format, wherein the data channel scheduled in the first DCI format uses a closed loop MIMO transmission manner, and the antenna configuration information comprises at least one of codeword information, antenna port information, reference signal scrambling code identifier information, precoding matrix identifier information, and information about the number of space layers;
a second determining module, adapted to determine that data transmitted over the data channel scheduled in the first DCI format determined by the first determining module is a retransmitted codeword; and
a third determining module, adapted to: if the second determining module determines that the data transmitted over the data channel scheduled in the first DCI format is a retransmitted codeword, determine, according to the antenna configuration information, that the number of layers occupied by the retransmitted codeword is greater than or equal to two layers, or that the number of layers occupied by the retransmitted codeword is equal to the number of layers occupied by an initially transmitted codeword corresponding to the retransmitted codeword, wherein the DCI format set determined by the first determining module further comprises a second DCI format, the second DCI format comprises dual-codeword control information, and a data channel scheduled based on the first DCI format and the second DCI format uses a closed loop MIMO transmission manner that is precoded based on channel information and comprised of one or more layers.

7. A control information transmission method, comprising:
obtaining a data channel transmission mode configured by a base station;
determining a downlink control information (DCI) format set corresponding to the transmission mode, wherein the DCI format set comprises a first DCI format, and the first DCI format comprises single-codeword control information;
detecting, according to the DCI format set, control signaling sent by the base station and corresponding to the DCI format set;
when the control signaling corresponding to the first DCI format is detected, receiving or sending, according to antenna configuration information comprised in the first DCI format, the data channel scheduled in the first DCI format, wherein the data channel scheduled in the first DCI format uses a closed loop MIMO transmission manner, and the antenna configuration information comprises at least one of codeword information, antenna port information, reference signal scrambling code identifier information, precoding matrix identifier information, and information about the number of space layers;
determining, according to the control signaling corresponding to the first DCI format, that data transmitted over the data channel scheduled in the first DCI format is a retransmitted codeword; and
determining, according to the antenna configuration information, that the retransmitted codeword uses a preconfigured antenna port, or that the retransmitted codeword uses a same antenna port as that of the initially transmitted codeword corresponding to the retransmitted codeword, wherein the DCI format set further comprises a second DCI format, the second DCI format comprises dual-codeword control information, and a data channel scheduled based on the first DCI format and the second DCI format uses a closed loop MIMO transmission manner that is precoded based on channel information and comprised of one or more layers.

8. A control information transmission method, comprising:
obtaining a data channel transmission mode configured by a base station;
determining a downlink control information (DCI) format set corresponding to the transmission mode, wherein the DCI format set comprises a first DCI format, and the first DCI format comprises single-codeword control information;
detecting, according to the DCI format set, control signaling sent by the base station and corresponding to the DCI format set;
when the control signaling corresponding to the first DCI format is detected, receiving or sending, according to antenna configuration information comprised in the first DCI format, the data channel scheduled in the first DCI format, wherein the data channel scheduled in the first DCI format uses a closed loop MIMO transmission manner, and the antenna configuration information comprises at least one of codeword information, antenna port information, reference signal scrambling code identifier information, precoding matrix identifier information, and information about the number of space layers;
determining, according to the control signaling corresponding to the first DCI format, that data transmitted over the data channel scheduled in the first DCI format is a retransmitted codeword; and
determining, according to the antenna configuration information, that the retransmitted codeword uses a preconfigured precoding matrix identifier, wherein the DCI format set further comprises a second DCI format, the second DCI format comprises dual-codeword control information, and a data channel scheduled based on the first DCI format and the second DCI format uses a closed loop MIMO transmission manner that is precoded based on channel information and comprised of one or more layers.

9. A user equipment, comprising:
a first obtaining module, adapted to obtain a data channel transmission mode configured by a base station;
a first determining module, adapted to determine a downlink control information (DCI) format set corresponding to the transmission mode obtained by the first obtaining module, wherein the DCI format set comprises a first DCI format, and the first DCI format comprises single-codeword control information;
a detecting module, adapted to detect, according to the DCI format set determined by the first determining module, control signaling sent by the base station and corresponding to the DCI format set;
a transmitting module, adapted to: when the detecting module detects the control signaling corresponding to the first DCI format, receive or send, according to antenna configuration information comprised in the first DCI format, the data channel scheduled in the first DCI format, wherein the data channel scheduled in the first DCI format uses a closed loop MIMO transmission manner, and the antenna configuration information comprises at least one of codeword information, antenna port information, reference signal scrambling code identifier information, precoding matrix identifier information, and information about the number of space layers;
a second determining module, adapted to determine, according to the control signaling corresponding to the first DCI format determined by the first determining module, that data transmitted over the data channel scheduled in the first DCI format is a retransmitted codeword; and
a fourth determining module, adapted to: if the second determining module determines that the data transmitted over the data channel scheduled in the first DCI format is a retransmitted codeword, determine, according to the antenna configuration information, that the retransmitted codeword uses a preconfigured antenna port, or that the retransmitted codeword uses a same antenna port as that of the initially transmitted codeword corresponding to the retransmitted codeword, wherein the DCI format set determined by the first determining module further comprises a second DCI format, the second DCI format comprises dual-codeword control information, and a data channel scheduled based on the first DCI format and the second DCI format uses a closed loop MIMO transmission manner that is precoded based on channel information and comprised of one or more layers.

10. A user equipment, comprising:
a first obtaining module, adapted to obtain a data channel transmission mode configured by a base station;
a first determining module, adapted to determine a downlink control information (DCI) format set corresponding to the transmission mode obtained by the first obtaining module, wherein the DCI format set comprises a first DCI format, and the first DCI format comprises single-codeword control information;
a detecting module, adapted to detect, according to the DCI format set determined by the first determining module, control signaling sent by the base station and corresponding to the DCI format set;
a transmitting module, adapted to: when the detecting module detects the control signaling corresponding to the first DCI format, receive or send, according to antenna configuration information comprised in the first DCI format, the data channel scheduled in the first DCI format, wherein the data channel scheduled in the first DCI format uses a closed loop MIMO transmission manner, and the antenna configuration information comprises at least one of codeword information, antenna port information, reference signal scrambling code identifier information, precoding matrix identifier information, and information about the number of space layers;
a second determining module, adapted to determine, according to the control signaling corresponding to the first DCI format determined by the first determining module, that data transmitted over the data channel scheduled in the first DCI format is a retransmitted codeword; and
a fifth determining module, adapted to: if the second determining module determines that the data transmitted over the data channel scheduled in the first DCI format is a retransmitted codeword, determine, according to the antenna configuration information, that the retransmitted codeword uses a preconfigured precoding matrix identifier,
wherein the DCI format set determined by the first determining module further comprises a second DCI format, the second DCI format comprises dual-codeword control information, and a data channel scheduled based on the first DCI format and the second DCI format uses a closed loop MIMO transmission manner that is precoded based on channel information and comprised of one or more layers.

* * * * *